US011475390B2

(12) United States Patent
Torii et al.

(10) Patent No.: US 11,475,390 B2
(45) Date of Patent: Oct. 18, 2022

(54) LOGISTICS SYSTEM, PACKAGE DELIVERY METHOD, AND PROGRAM

(71) Applicant: RAKUTEN GROUP, INC., Tokyo (JP)

(72) Inventors: Junji Torii, Tokyo (JP); Hideaki Mukai, Tokyo (JP); Takayuki Kageyama, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 555 days.

(21) Appl. No.: 16/066,294

(22) PCT Filed: Dec. 29, 2015

(86) PCT No.: PCT/JP2015/086580
§ 371 (c)(1),
(2) Date: Jun. 26, 2018

(87) PCT Pub. No.: WO2017/115446
PCT Pub. Date: Jul. 6, 2017

(65) Prior Publication Data
US 2019/0019141 A1    Jan. 17, 2019

(51) Int. Cl.
*G06Q 10/08* (2012.01)
*B64C 39/02* (2006.01)
(Continued)

(52) U.S. Cl.
CPC ......... *G06Q 10/0832* (2013.01); *B64C 27/08* (2013.01); *B64C 39/024* (2013.01);
(Continued)

(58) Field of Classification Search
USPC ....................................................... 705/332
See application file for complete search history.

(56) References Cited

U.S. PATENT DOCUMENTS 9,056,676 B1   6/2015 Wang
9,158,904 B1*  10/2015 Ross .................. G06K 9/00221
(Continued)

FOREIGN PATENT DOCUMENTS

CN    103778523 A    5/2014
CN    104980281 A    10/2015
(Continued)

OTHER PUBLICATIONS

D. Jeon, K. Cho and D. Kim, "Vision-Based Autonomous Landing for Small-Scale Unmanned Rotorcraft," Apr. 21, 2011. 2011 14th IEEE International Symposium on Object/Component/Service-Oriented Real-Time Distributed Computing Workshops, pp. 274-280. (Year: 2011).*
(Continued)

*Primary Examiner* — Jeff Zimmerman
*Assistant Examiner* — Hunter A Molnar
(74) *Attorney, Agent, or Firm* — HEA Law PLLC

(57) ABSTRACT

Association means of a logistics system associates authentication information on a user with the package and storing the associated authentication information into a storage means; Instruction means instructs an unmanned aerial vehicle into which the package is to be loaded to move to the location, based on location information on a location of a collection destination or a delivery destination of the package. Arrival determination means determines whether the unmanned aerial vehicle has arrived at the location. Checking means checks whether the user is at the location based on the authentication information associated with the package and on a situation of the location detected by the unmanned aerial vehicle or details of communication to and from a terminal of the user. Movement control means moves the unmanned aerial vehicle toward the user at the location when the checking means confirms that the user is at the location.

18 Claims, 15 Drawing Sheets

(51) Int. Cl.
  *G06F 21/31*   (2013.01)
  *G06V 20/10*   (2022.01)
  *B64C 27/08*   (2006.01)
  *G06Q 50/28*   (2012.01)
  *G06F 21/44*   (2013.01)
  *H04W 12/06*   (2021.01)
  *H04W 12/63*   (2021.01)

(52) U.S. Cl.
  CPC .............. *G06F 21/31* (2013.01); *G06F 21/44* (2013.01); *G06Q 50/28* (2013.01); *H04W 12/06* (2013.01); *H04W 12/63* (2021.01); *B64C 2201/128* (2013.01); *G06F 2221/2129* (2013.01); *G06V 20/10* (2022.01)

(56) References Cited

U.S. PATENT DOCUMENTS

| | | | | |
|---|---|---|---|---|
| 9,523,986 | B1* | 12/2016 | Abebe | G08G 5/00 |
| 2012/0078451 | A1 | 3/2012 | Ohtomo et al. | |
| 2012/0298752 | A1* | 11/2012 | Kim | G06K 7/1095 |
| | | | | 235/462.11 |
| 2013/0243264 | A1* | 9/2013 | Aoki | G06K 9/00013 |
| | | | | 382/115 |
| 2014/0032034 | A1* | 1/2014 | Raptopoulos | G05D 1/0088 |
| | | | | 701/25 |
| 2014/0254896 | A1* | 9/2014 | Zhou | G07F 17/12 |
| | | | | 382/124 |
| 2014/0351163 | A1* | 11/2014 | Tussy | G06Q 10/083 |
| | | | | 705/330 |
| 2015/0120094 | A1* | 4/2015 | Kimchi | G05D 1/00 |
| | | | | 701/3 |
| 2015/0170309 | A1* | 6/2015 | Diamond | H04N 5/772 |
| | | | | 705/325 |
| 2015/0248640 | A1* | 9/2015 | Srinivasan | G06Q 10/08355 |
| | | | | 705/338 |
| 2015/0302495 | A1* | 10/2015 | Stuckman | G06Q 30/0609 |
| | | | | 705/26.35 |
| 2015/0317597 | A1 | 11/2015 | Shucker et al. | |
| 2015/0334567 | A1* | 11/2015 | Chen | G06T 7/246 |
| | | | | 455/411 |
| 2015/0350520 | A1* | 12/2015 | Yamashita | G06F 21/31 |
| | | | | 348/207.11 |
| 2016/0012393 | A1* | 1/2016 | Wang | G06Q 10/08355 |
| | | | | 705/338 |
| 2016/0068264 | A1* | 3/2016 | Ganesh | G08G 5/0069 |
| | | | | 701/2 |
| 2016/0132708 | A1* | 5/2016 | Tsou | G06Q 30/02 |
| | | | | 235/462.1 |
| 2016/0239798 | A1* | 8/2016 | Borley | G06Q 10/08355 |
| 2016/0342934 | A1* | 11/2016 | Michalik | B64C 39/024 |

FOREIGN PATENT DOCUMENTS

| | | | |
|---|---|---|---|
| CN | 105139178 A | | 12/2015 |
| CN | 106605252 A | | 4/2017 |
| JP | 2005-263112 A | | 9/2005 |
| JP | 2006-092507 A | | 4/2006 |
| JP | 2012-071645 A | | 4/2012 |
| KR | 20160142017 A | * | 12/2016 |
| WO | WO-2015114149 A1 | * | 8/2015 ............... G01S 5/18 |

OTHER PUBLICATIONS

English translation of the International Search Report for PCT/JP2015/086580.

Office Action dated Apr. 18, 2017, for corresponding JP application No. 2016-570369 and the Partial Translation thereof.

Office Action dated Apr. 7, 2021, for corresponding CN Patent Application No. 201580085603.9 with partial English translation pp. 1-29.

* cited by examiner

FIG.5

| DELIVERY ID | REQUESTER INFORMATION | LOCATION INFORMATION | USER INFORMATION | AUTHENTICATION IMAGE DATA | DELIVERY DATE/TIME INFORMATION | UNMANNED AERIAL VEHICLE ID |
|---|---|---|---|---|---|---|
| d001 | REQUESTER A | DELIVERY DESTINATION B | USER C | IMAGE D | 2015/12/30 10:00-12:00 | V001 |
| d002 | REQUESTER E | POSITION OF TERMINAL F | USER G | IMAGE H | 2015/12/30 14:00-16:00 | V002 |
| ⋮ | ⋮ | ⋮ | ⋮ | ⋮ | ⋮ | ⋮ |

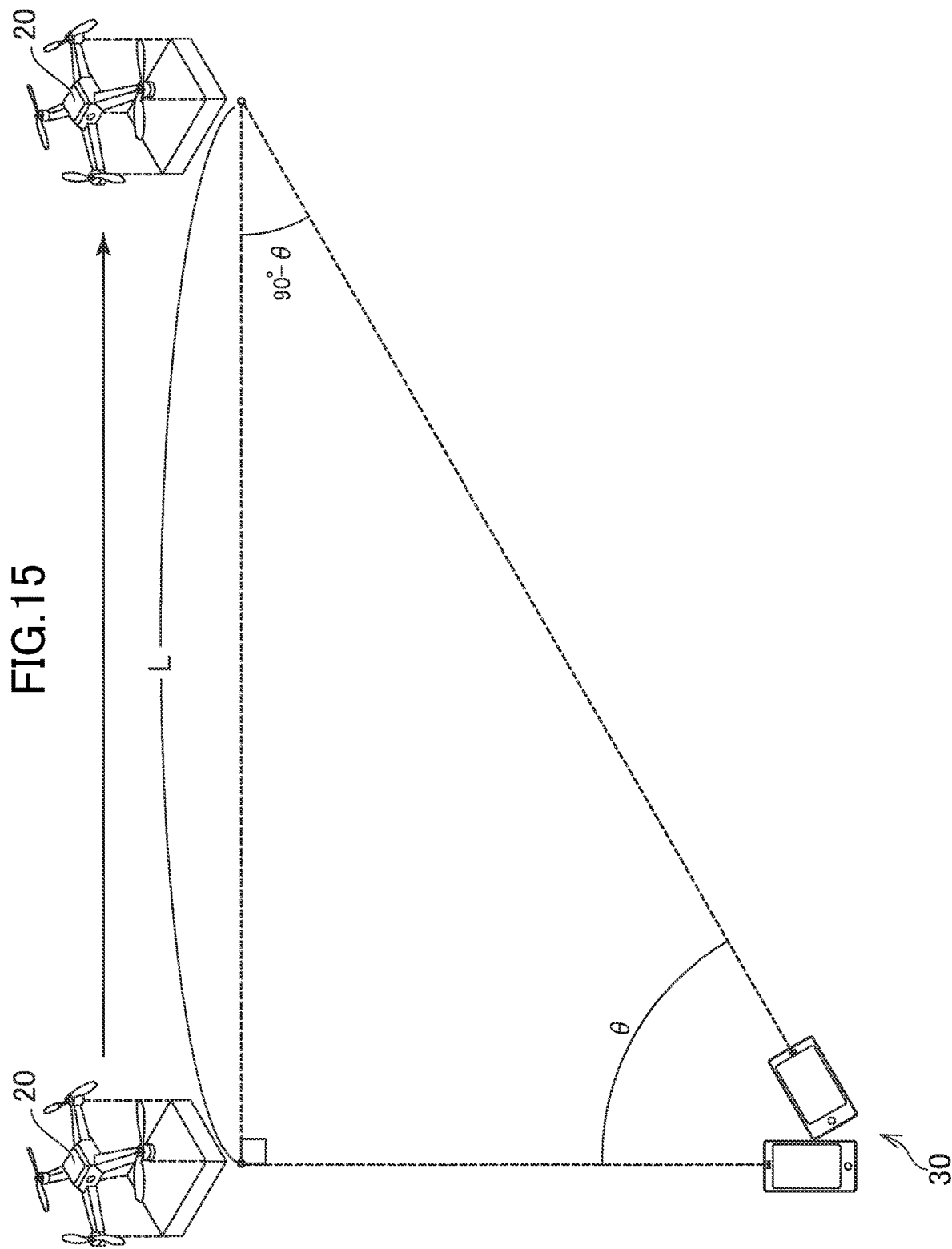

LOGISTICS SYSTEM, PACKAGE DELIVERY METHOD, AND PROGRAM

CROSS REFERENCE TO RELATED APPLICATIONS

This application is a National Stage of International Application No. PCT/JP2015/086580 tiled on Dec. 29, 2015. The contents of the above document is incorporated herein by reference in its entirety.

TECHNICAL FIELD

The present invention relates to a logistics system, a package delivery method, and a program.

BACKGROUND ART

Hitherto, there has been known a technology of improving convenience of collecting or delivering a package. For example, in Patent Literature 1, there is described a system configured to authenticate a valid user having a right to receive a package using a password or an image in order to prevent a third person from impersonating the user and stealing the package.

CITATION LIST

Patent Literature

[PTL 1] JP 2006-92507 A

SUMMARY OF INVENTION

Technical Problem

In recent years, there has been discussed a technology of causing an unmanned aerial vehicle to collect or deliver a package instead of a staff member of a carrier. However, for example, when the unmanned aerial vehicle has arrived at a collection destination or a delivery destination, a third person may leave or receive a package by mistake. The unmanned aerial vehicle, which accommodates no person, cannot check whether or not a user is at the collection destination or the delivery destination unlike the staff member of the carrier, and thus the user is required to leave or receive the package reliably.

The present invention has been made in view of the above-mentioned problem, and an object thereof is to enable a user to leave or receive a package reliably when an unmanned aerial vehicle collects or delivers the package.

Solution to Problem

In order to solve the above-mentioned problem, a logistics system according to one embodiment of the present invention includes: association means for associating authentication information on a user who is to leave or receive a package with the package and recording the associated authentication information into the storage means; instruction means for instructing an unmanned aerial vehicle into which the package is to be loaded to move to a location, based on location information on a location of a collection destination of the package or a location of a delivery destination of the package; arrival determination means for determining whether or not the unmanned aerial vehicle has arrived at the location based on position information on a position of the unmanned aerial vehicle and the location information; checking means for checking whether the user is at the location, when the arrival determination means determines that the unmanned aerial vehicle has arrived at the location, based on the authentication information associated with the package and on a situation of the location detected by the unmanned aerial vehicle or details of communication to and from a terminal; and movement control means for moving, when the checking means confirms that the user is at the location, the unmanned aerial vehicle toward the user at the location.

A logistics method according to one embodiment of the present invention includes: an association step of associating authentication information on a user who is to leave or receive a package with the package and recording the associated authentication information into a storage means; an instruction step of instructing an unmanned aerial vehicle into which the package is to be loaded to move to a location, based on location information on a location of a collection destination of the package or a location of a delivery destination of the package; an arrival determination step of determining whether the unmanned aerial vehicle has arrived at the location based on position information on a position of the unmanned aerial vehicle and the location information; a checking step of checking whether the user is at the location, when it is determined in the arrival determination step that the unmanned aerial vehicle has arrived at the location, based on the authentication information associated with the package and on a situation of the location detected by the unmanned aerial vehicle or details of communication to and from a terminal; and a movement control step of moving the unmanned aerial vehicle toward the user at the location when the checking means confirms that the user is at the location.

A program according to one embodiment of the present invention causes a computer to function as: association means for associating authentication information on a user who is to leave or receive a package with the package and recording the associated authentication information into storage means; instruction means for instructing an unmanned aerial vehicle into which the package is to be loaded to move to a location, based on location information on a location of a collection destination of the package or a location of a delivery destination of the package; arrival determination means for determining whether the unmanned aerial vehicle has arrived at the location based on position information on a position of the unmanned aerial vehicle and the location information; checking means for checking whether the user is at the location, when the arrival determination means determines that the unmanned aerial vehicle has arrived at the location, based on the authentication information associated with the package and on a situation of the location detected by the unmanned aerial vehicle or details of communication to and from a terminal; and movement control means for moving the unmanned aerial vehicle toward the user at the location when the checking means confirms that the user is at the location.

Further, an information storage medium according to one embodiment of the present invention is a computer-readable information storage medium having the above-mentioned program stored thereon.

Further, in one aspect of the present invention, the logistics system further includes notification means for notifying the user of the authentication information associated with the package by the association means, and the checking means is configured to perform checking based on the authentication information notified by the notification means.

Further, in one aspect of the present invention, the unmanned aerial vehicle includes a camera, the authentication information includes authentication image data on an authentication image, the notification means is configured to transmit the authentication image data to the terminal of the user, and the checking means is configured to perform checking by determining whether or not a photographed image, which is obtained by photographing the situation of the location by the camera, contains the authentication image displayed on the terminal.

Further, in one aspect of the present invention, the unmanned aerial vehicle includes a camera, the authentication information includes appearance information on an appearance of the user, and the checking means is configured to perform checking by determining whether or not a photographed image, which is obtained by photographing the situation of the location by the camera, contains the user.

Further, in one aspect of the present invention, the unmanned aerial vehicle includes a camera, and the checking means is configured to perform checking by determining whether or not photographed images, which are obtained by photographing the situation of the location continuously or repeatedly by the camera, exhibit a predetermined pattern of changes.

Further, in one aspect of the present invention, the unmanned aerial vehicle includes a camera, the checking means is configured to perform checking by determining whether or not a photographed image, which is obtained by photographing the situation of the location by the camera, contains a first situation, the logistics system further includes distance information acquisition means for acquiring distance information on a distance between the unmanned aerial vehicle and the user, and the checking means is configured to check whether the photographed image contains a second situation different from the first situation, to thereby perform checking in a stepwise manner depending on the distance information, when the distance information indicates a distance smaller than a predetermined distance.

Further, in one aspect of the present invention, the unmanned aerial vehicle includes a camera, the checking means is configured to perform checking by determining whether or not a degree of similarity between a situation of the location, which is contained in the photographed image obtained by photographing the situation of the location by the camera, and a predetermined situation is equal to or larger than a threshold value, the logistics system further includes distance information acquisition means for acquiring distance information on a distance between the unmanned aerial vehicle and the user, and the checking means is configured to change the threshold value and perform determination based on the changed threshold value, to thereby perform checking in a stepwise manner depending on the distance information, when the distance information indicates a distance smaller than a predetermined distance.

Further, in one aspect of the present invention, the unmanned aerial vehicle and the terminal are each capable of performing short-range communication, the logistics system further includes authentication information acquisition means for acquiring the authentication information from the terminal when the unmanned aerial vehicle and the terminal are connected to each other by the short-range communication, and the checking means is configured to perform checking based on the authentication information.

Further, in one aspect of the present invention, the unmanned aerial vehicle includes a camera, the logistics system further includes position estimation means for estimating a position of the user based on a photographed image, which is obtained by photographing the situation of the location by the camera, and the movement control means is configured to move the unmanned aerial vehicle based on the position estimated by the position estimation means.

Further, in one aspect of the present invention, the unmanned aerial vehicle is configured to generate an electromagnetic wave or sound wave having directivity in a plurality of directions, when the arrival determination means determines that the unmanned aerial vehicle has arrived at the location, the logistics system further includes: timing information acquisition means for acquiring timing information on a timing at which the terminal has detected the electromagnetic wave or the sound wave; and position estimation means for estimating a position of the user based on the timing information, and the movement control means is configured to move the unmanned aerial vehicle based on the position estimated by the position estimation means.

Further, in one aspect of the present invention, the terminal is configured to receive a positional relationship indication operation for indicating a positional relationship between the terminal and the unmanned aerial vehicle, the logistics system further includes position estimation means for estimating a position of the user based on the positional relationship indication operation, and the movement control means is configured to move the unmanned aerial vehicle based on the position estimated by the position estimation means.

Further, in one aspect of the present invention, the terminal is configured to receive a direction instruction operation for indicating a movement direction of the unmanned aerial vehicle, and the movement control means is configured to move the unmanned aerial vehicle based on the direction instruction operation.

Further, in one aspect of the present invention, the unmanned aerial vehicle and the terminal are each capable of performing short-range communication, the logistics system further includes position estimation means for estimating a position of the user based on a communication state in a case where the unmanned aerial vehicle and the terminal are connected to each other by the short-range communication, and the movement control means is configured to move the unmanned aerial vehicle based on the position estimated by the position estimation means.

Further, in one aspect of the present invention, the unmanned aerial vehicle is configured to wait at a height of a predetermined level or more after the unmanned aerial vehicle has arrived at the location, and the movement control means is configured to cause, when the checking means confirms that the user is at the location, the unmanned aerial vehicle to descend to a height less than the predetermined level at the location, to thereby move the unmanned aerial vehicle toward the user.

Further, in one aspect of the present invention, the logistics system further includes location information acquisition means for acquiring terminal position information on a position of the terminal of the user as the location information.

Further, in one aspect of the present invention, the unmanned aerial vehicle includes a camera, and the logistics system further includes image storage means for storing an image, which is obtained by photographing the user leaving or receiving the package by the camera, into the storage means.

Advantageous Effects of Invention

According to the present invention, it is possible to enable a user to leave or receive a package reliably when an unmanned aerial vehicle collects or delivers the package.

BRIEF DESCRIPTION OF DRAWINGS

FIG. 5 is a table for showing an example of storage of data into a delivery database.

FIG. 15 is a diagram for illustrating a situation in which a user indicates a positional relationship between the user and the unmanned aerial vehicle.

DESCRIPTION OF EMBODIMENTS

1. Hardware Configuration of Logistics System

In the following, a description is given of a logistics system according to an exemplary embodiment of the present invention. In this embodiment, a description is given of a case in which an unmanned aerial vehicle delivers a package as an example, and a case in which the unmanned aerial vehicle collects a package is described in a modification example of the present invention described later.

Figure 1:
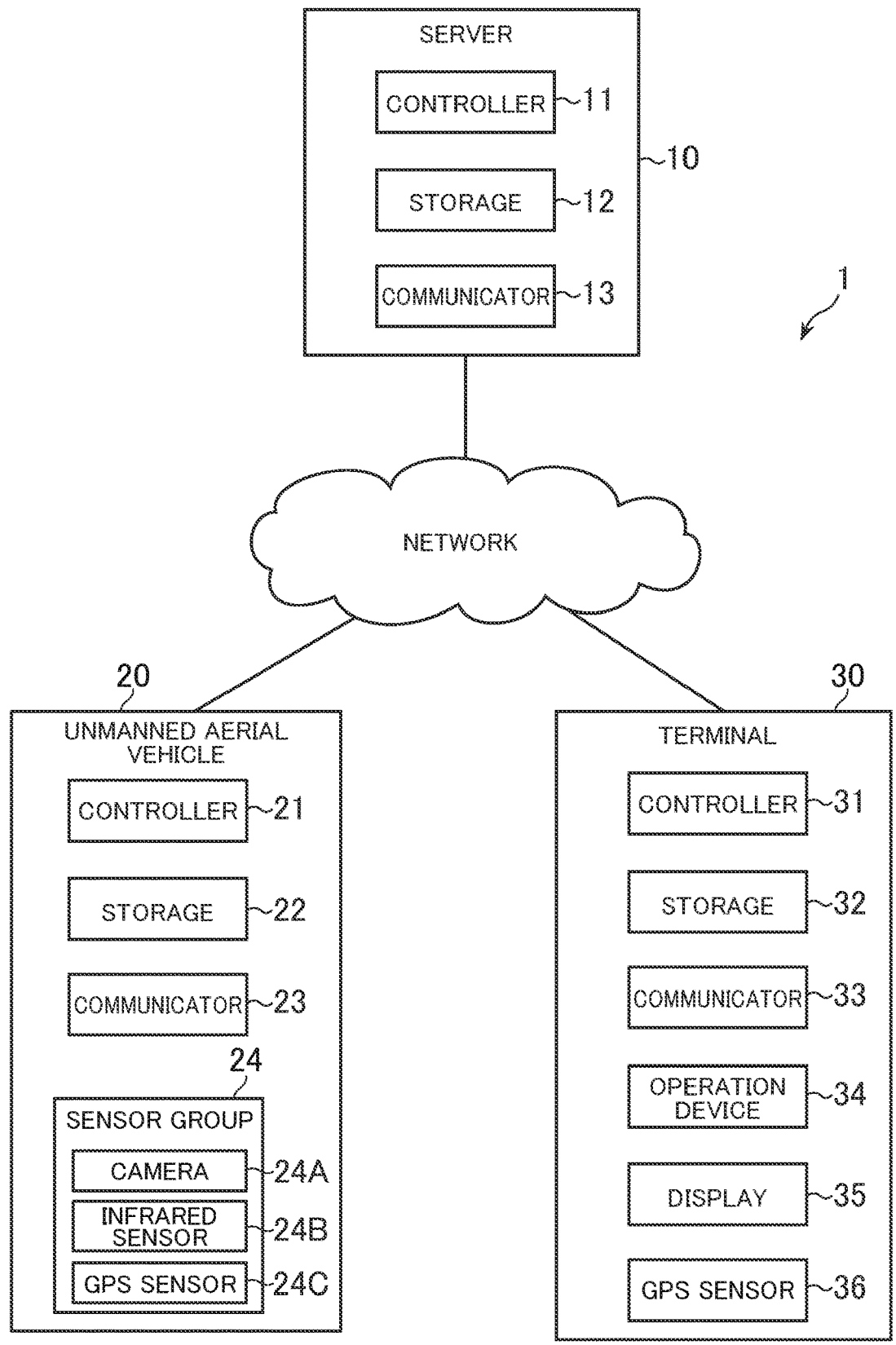
FIG. 1 is a diagram for illustrating a hardware configuration of a logistics system.

FIG. 1 is a diagram for illustrating a hardware configuration of the logistics system. As illustrated in FIG. 1, a logistics system 1 includes a server 10, an unmanned aerial vehicle 20, and a terminal 30. The server 10, the unmanned aerial vehicle 20, and the terminal 30 are connected to one another via a network so that those components can communicate data to one another. In FIG. 1, the numbers of servers 10, unmanned aerial vehicles 20, and terminals 30 are each one, but the number of each of those components may be two or more.

The server 10 is a server computer managed by a carrier. The server 10 includes a controller 11, a storage 12, and a communicator 13. The controller 11 includes, for example, one or more microprocessors. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a hard disk drive or a flash memory. The communicator 13 includes a network card for wired communication or wireless communication. The communicator 13 performs data communication via the network.

The unmanned aerial vehicle 20 is an aerial vehicle that does not accommodate a person, and is, for example, an unmanned aerial vehicle (so-called drone) driven by a battery or an unmanned aerial vehicle driven by an engine. For example, the unmanned aerial vehicle 20 is arranged at, for example, a collection center of a business operator of the logistics system 1. The unmanned aerial vehicle 20 includes a controller 21, a storage 22, a communicator 23, and a sensor group 24. The unmanned aerial vehicle 20 includes common hardware components such as a propeller, a motor, and a battery, which are omitted here. Further, the hardware configurations of the controller 21, the storage 22, and the communicator 23 are similar to those of the controller 11, the storage 12, and the communicator 13, and thus a description thereof is omitted here.

In this embodiment, the unmanned aerial vehicle 20 includes a storage portion for storing a package. The storage portion is only required to be a space capable of storing packages, and may be integrated with or separate from a casing of the unmanned aerial vehicle 20. When the storage portion is integrated with the casing of the unmanned aerial vehicle 20, for example, a package room (trunk) included inside the casing of the unmanned aerial vehicle 20 corresponds to the storage portion. When the storage portion is separate from the casing of the unmanned aerial vehicle 20, a container hung from the unmanned aerial vehicle 20 by, for example, a string, wire, chain, or hanging hook, may correspond to the storage portion, or a container connected to the casing of the unmanned aerial vehicle 20 by, for example, an adhesive or a magnet, may correspond to the storage portion. Further, the storage portion may be made of any storage member, and for example, the storage portion may be a box, sack, net, bag, or receptacle (case) in addition to the package room or container as described above.

The sensor group 24 includes a camera 24A, an infrared sensor 24B, and a GPS sensor 24C. The camera 24A records an image (still image or moving image) photographed by an image pickup element such as a CCD image sensor or a CMOS image sensor as digital data. The infrared sensor 24B is a quantum-type infrared sensor or heat-type infrared sensor configured to detect a distance to an object using an infrared ray. The GPS sensor 24C includes a receiver configured to receive signals from satellites, and detects positional information. Any sensor may be mounted on the unmanned aerial vehicle 20, and the sensor group 24 may include, for example, a sound sensor (microphone), an anemometer, an acceleration sensor, a gyro sensor, a geomagnetic sensor, a height sensor, a displacement sensor, or a temperature sensor.

The terminal 30 is a computer to be operated by a user, and is, for example, a mobile information terminal (including tablet computer), a cell phone (including smartphone), or a personal computer. The "user" is a person having a right to receive a package, and is, for example, a recipient or a representative specified by a requester of the delivery service.

The terminal 30 includes a controller 31, a storage 32, a communicator 33, an operation device 34, a display 35, and a GPS sensor 36. The hardware configurations of the controller 31, the storage 32, the communicator 33, and the GPS sensor 36 are similar to those of the controller 11, the storage 12, the communicator 13, and the GPS sensor 24C, and thus a description thereof is omitted here.

The operation device 34 is an input device to be used by a player for operation, and is, for example, a touch panel, a pointing device, for example, a mouse, or a keyboard. The operation device 34 transfers details of operation by the player to the controller 31. The display 35 is, for example, a liquid crystal display or an organic EL display. The display 35 displays a screen in accordance with an instruction given by the controller 31.

Programs and data to be described as being stored into the storages 12, 22, and 23 may be supplied thereto via a network. Further, the hardware configurations of the server 10, the unmanned aerial vehicle 20, and the terminal 30 are not limited to the above-mentioned examples, and various pieces of computer hardware can be applied. For example, each of the server 10, the unmanned aerial vehicle 20, the terminal 30 may include a reader (e.g., optical disc drive or memory card slot) configured to read a computer-readable information storage medium. In this case, programs and data stored in the computer-readable information storage medium may be supplied to each computer via the reader.

2. Outline of Processing of Logistics System

Figure 2:
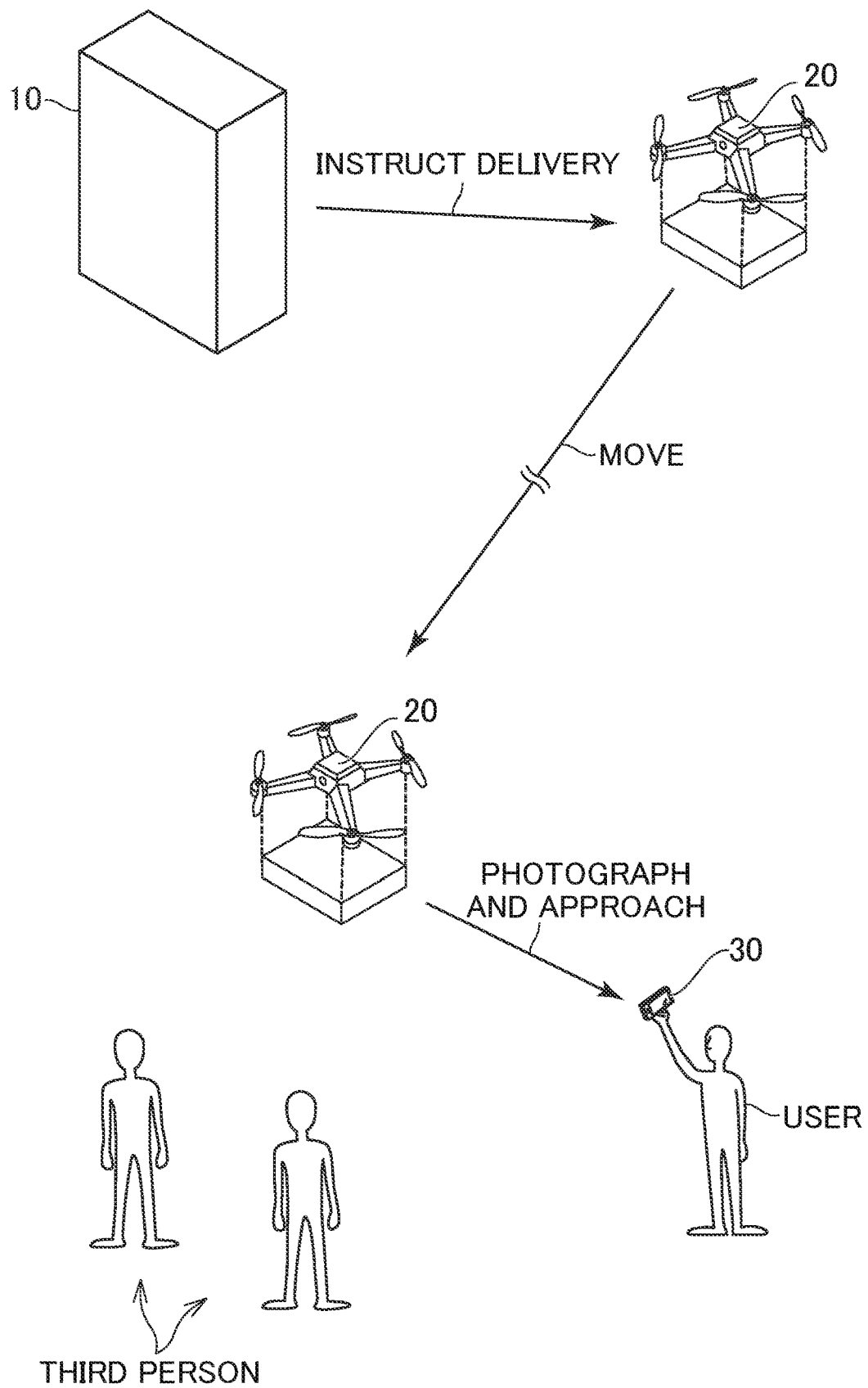
FIG. 2 is a diagram for illustrating an outline of processing of the logistics system.

FIG. 2 is a diagram for illustrating an outline of processing of the logistics system. As illustrated in FIG. 2, the server 10 gives a delivery instruction to the unmanned aerial vehicle 20 so that a package is loaded into the unmanned aerial vehicle 20 and the unmanned aerial vehicle 20 flies to a delivery destination when a delivery date/time of the package approaches. The delivery destination may be an address specified in advance, but in this embodiment, the position of the terminal 30 is set as the delivery destination. Thus, when the unmanned aerial vehicle 20 receives the delivery instruction, the package is loaded into the unmanned aerial vehicle 20 and the unmanned aerial vehicle 20 flies to the terminal 30. The delivery date/time is notified to the user in advance by, for example, an email. When the delivery date/time approaches, the user holds the terminal 30 and waits for arrival of the unmanned aerial vehicle 20. When the unmanned aerial vehicle 20 arrives near the terminal 30, it is checked whether or not a valid user is at the delivery destination to pass the package. In this embodiment, an authentication image is used for this checking.

Figure 3:
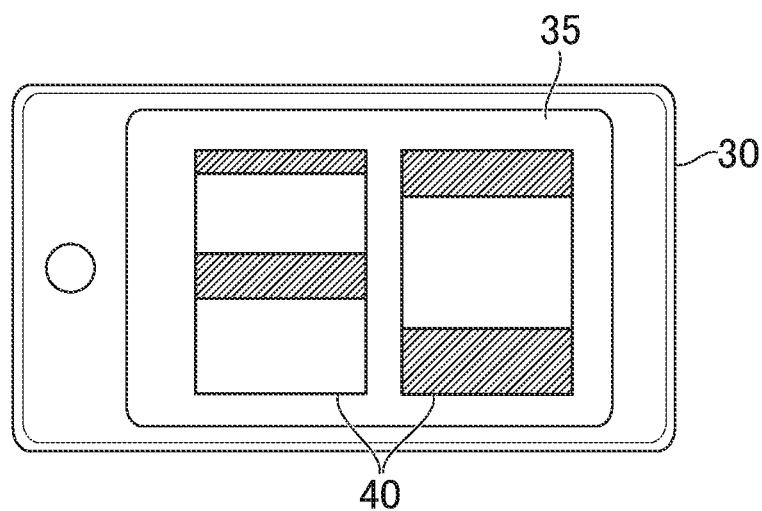
FIG. 3 is a diagram for illustrating an example of an authentication image.

FIG. 3 is a diagram for illustrating an example of the authentication image. It is assumed that the authentication image is transmitted to the unmanned aerial vehicle 20 and the terminal 30 in advance. When the unmanned aerial vehicle 20 arrives near the terminal 30, the unmanned aerial vehicle 20 hovers and waits in the sky. During that time, the user causes the display 35 to display an authentication image 40 and directs a screen toward the unmanned aerial vehicle 20. The unmanned aerial vehicle 20 photographs the surroundings with the camera 24A, and determines that a valid user is at the delivery destination when a photographed image contains the authentication image 40. Then, the unmanned aerial vehicle 20 estimates the position of the user based on the position of the authentication image 40 in the photographed image, approaches the user, and passes the package to the user. In this manner, in the logistics system 1, it is possible to prevent the package from being erroneously passed to a third person at the delivery destination, and the user can reliably receive the package at the delivery destination. In the following, a description is given of details of this technology. When it is not particularly required to refer to the drawings, the reference numeral of the authentication image is omitted.

3. Functions to be Implemented by Logistics System

Figure 4:
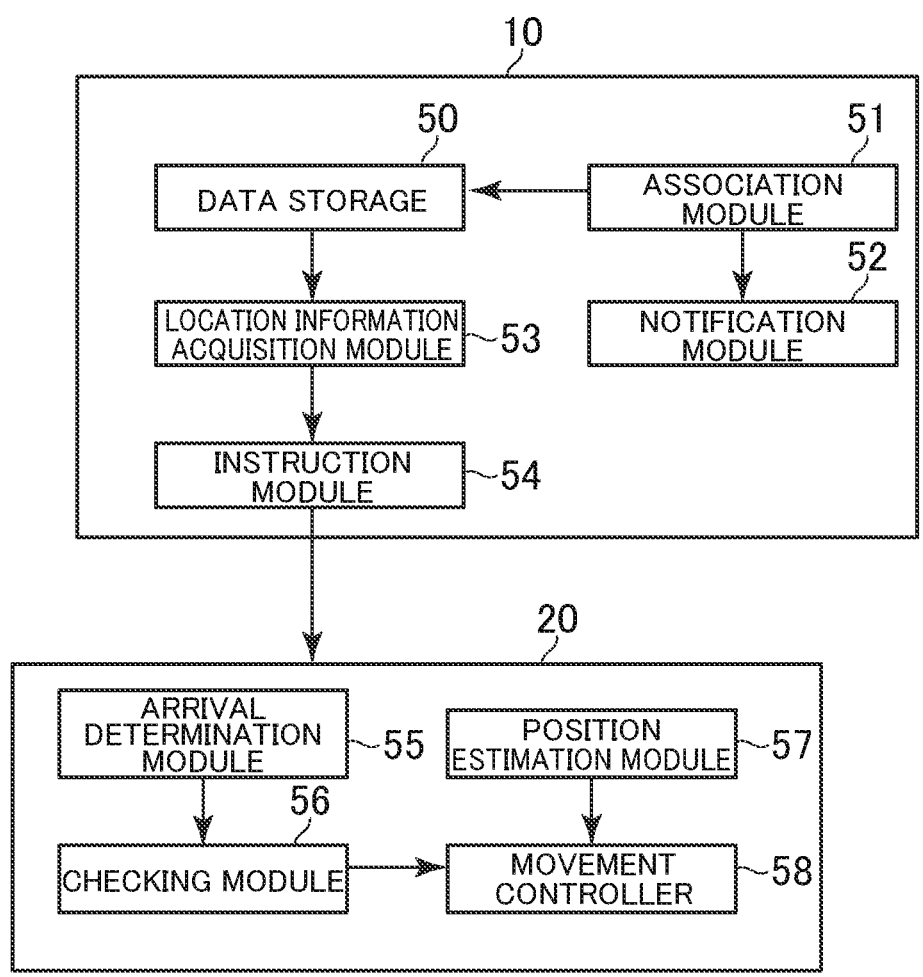
FIG. 4 is a functional block diagram for illustrating an example of functions to be implemented by the logistics system.

FIG. 4 is a functional block diagram for illustrating an example of functions to be implemented by the logistics system 1. As illustrated in FIG. 4, in this embodiment, a description is given of a case in which a data storage 50, an association module 51, a notification module 52, a location information acquisition module 53, an instruction module 54 are implemented by the server 10, and an arrival determination module 55, a checking module 56, a position estimation module 57, and a movement controller 58 are implemented by the unmanned aerial vehicle 20.

3-1. Data Storage

The storage 12 mainly implements the data storage 50. The data storage 50 stores data for the unmanned aerial vehicle 20 to deliver a package. Now, a description is given of a delivery database as data to be stored in the data storage 50.

FIG. 5 is a table for showing an example of storage of data into the delivery database. As shown in FIG. 5, the delivery database stores data on a package to be delivered. As shown in FIG. 5, for example, the delivery database stores a delivery ID for uniquely identifying delivery, requester information on a requester who has requested delivery, location information on a location of the delivery destination of a package, user information on a user, authentication image data on an authentication image, delivery date/time information on a delivery date/time, and an unmanned aerial vehicle ID for uniquely identifying an unmanned aerial vehicle.

The requester information contains the name of a requester and contact information. The name of a requester is the company name or name of the requester. The contact information is, for example, the address of a requester, a phone number, and an email address.

The location information is address information or latitude/longitude information on a location at which the user is to receive a package. The latitude/longitude information is information for identifying a position in the north-south direction and a position in the east-west direction on the earth, and is for example, represented by each numerical value of a degree, an arcminute, and an arcsecond. In this embodiment, a description is given of a case in which a location indicated by the location information is the delivery destination. For example, the position of the terminal 30 of the user can be set as the delivery destination. In this case, the location information stores information indicating that the terminal 30 of the user is specified as the delivery destination, and for example, the location information stores a terminal ID for uniquely identifying the terminal 30, individual identification information on the terminal 30, or an IP address.

The user information contains the name of a user, the terminal information on the terminal 30, and contact information. The name of the user is the company name or name of the user. The terminal information is information for identifying the terminal 30, and is, for example, the terminal ID, the individual identification information, and the IP address. The contact information is, for example, the address, phone number, and email address of the user. For example, the terminal information or contact information may be used as a destination in a case where an authentication image or message is to be transmitted to the user.

The authentication image data is image data on an authentication image. As described above, the authentication image corresponds to authentication information for authenticating the valid user. In this embodiment, a description is given of a case of generating an authentication image for each delivery, but the authentication image may be generated for each user. The authentication image is only required to be an image detectable by the camera 24A, and the shape, pattern, color, size, resolution, number of colors, and file format may be set in any manner.

The delivery date/time information indicates at least one of the delivery date or delivery time. The delivery date/time may be a date/time specified by the requester or user, or may be a date/time specified by the carrier. When the delivery date/time of the package is not particularly specified, the delivery date/time information does not store data.

The unmanned aerial vehicle ID is an unmanned aerial vehicle ID of the unmanned aerial vehicle 20 in charge of delivery. The unmanned aerial vehicle 20 in charge of delivery is only required be determined based on a method determined in advance. For example, the unmanned aerial vehicle 20 may be determined at random, or the unmanned aerial vehicle 20 that can be in charge of delivery may be selected based on the weight of the package from among the plurality of unmanned aerial vehicles 20. In other cases, for example, information on a remaining quantity of the battery or fuel may be acquired from each unmanned aerial vehicle 20, and the unmanned aerial vehicles 20 may be determined based on the information on the remaining quantity. Further, for example, an operator of the carrier may specify the unmanned aerial vehicle ID.

Data to be stored into the data storage 50 is not limited to the above-mentioned example. For example, the data storage 50 may store an unmanned aerial vehicle database storing basic information on the unmanned aerial vehicle 20. The unmanned aerial vehicle database may store destination information (e.g., email address, individual identification information, or IP address) for transmitting an instruction to the unmanned aerial vehicle 20 in association with the unmanned aerial vehicle ID. Further, for example, the data storage 50 may store data or map data on a relationship between the address information and the latitude/longitude information.

3-2. Association Module

The controller 11 mainly implements the association module 51. The association module 51 associates authentication information on the user who is to receive a package with the package and records the associated authentication information into the data storage 50. For example, the association module 51 records the authentication information in association with the package by storing the authentication information into the delivery database together with the delivery ID of the package.

The authentication information is only required to be information that verifies the right to receive a package, but in this embodiment, a description is given of a case in which the authentication information is authentication image data on the authentication image. When the server 10 receives a request for delivering a package, the association module 51 generates the delivery ID of the package and authentication image data for storage into the delivery database. The authentication image data may not be generated when the delivery request is received, but may be selected from among pieces of authentication image data prepared in advance. In this case, the authentication image data may be stored in the data storage 50 in advance.

3-3. Notification Module

The controller 11 mainly implements the notification module 52. The notification module 52 notifies the user of authentication image data (example of authentication information) associated with the package by the association module 51. The notification module 52 may transmit the authentication image data to the terminal 30, or may transmit only the storage location (e.g., URL) of the authentication image data to the terminal 30. When only the storage location is notified, the user may operate the terminal 30 to access the storage location, and download the authentication image data into the terminal 30 for display.

3-4. Location Information Acquisition Module

The controller 11 mainly implements the location information acquisition module 53. The location information acquisition module 53 acquires the location information. As described above, in this embodiment, a description is given of a case in which the delivery destination is the position of the terminal 30. Thus, the location information acquisition module 53 acquires terminal position information on the position of the terminal 30 of the user as the location information. The terminal position information is only required to be information capable of identifying the position of the terminal 30. In this embodiment, a description is given of a case of using the latitude/longitude information detected by the GPS sensor 36 of the terminal 30 as the terminal position information, but information (e.g., access point information on wireless LAN) on a base station to/from which the terminal 30 wirelessly communicates may be used as the terminal position information. The location information acquisition module 53 may directly receive the terminal position information from the terminal 30, or may receive the terminal position information via the server 10.

3-5. Instruction Module

The controller 11 mainly implements the instruction module 54. The instruction module 54 instructs the unmanned aerial vehicle 20 into which the package is loaded to move to the delivery destination based on the location information on the location of the delivery destination of the package. This instruction is hereinafter referred to as "delivery instruction". The instruction module 54 gives a delivery instruction by transmitting data of a predetermined format to the unmanned aerial vehicle 20. It is assumed that the delivery instruction contains location information, user information, authentication image data, and delivery date/time information. The unmanned aerial vehicle 20 stores each piece of information contained in the delivery instruction into the storage 22, and starts to fly to a location indicated by the location information. The package to be delivered may be loaded into the storage portion of the unmanned aerial vehicle 20 in advance by the carrier.

A method of flying to the specified location by the unmanned aerial vehicle 20 may be performed by a known automatic maneuvering method. For example, the unmanned aerial vehicle 20 may set the latitude/longitude information acquired from the GPS sensor 24C as the current location, and set the latitude/longitude information indicated by the location information as the destination location to automatically fly. Then, the unmanned aerial vehicle 20 may control the propeller so that a direction from the current location toward the destination location is a progress direction. The progress direction is determined by using a direction acquired from the geomagnetic sensor of the sensor group 24. Further, the server 10 may give flight path information on a flight path to the destination location (delivery destination in this embodiment) to the unmanned aerial vehicle 20. The flight path information is information indicating a flight path for reaching the destination location, and may be, for example, information obtained by connecting pieces of latitude/longitude information to the destination location in order so as to indicate the flight path. The server 10 may generate the flight path information based on a predetermined path search algorithm. The flight path information may be contained in the delivery instruction. The unmanned aerial vehicle 20 executes automatic maneuvering control for reaching the destination location based on the flight path information received from the server 10.

Further, the unmanned aerial vehicle 20 may determine a timing of departing from a standby location, for example, a warehouse of the carrier, to be in time for the delivery date/time based on the current time information acquired by a real-time clock of the controller 21 and the delivery date/time information. Signals from a satellite contain time information based on an atomic clock mounted on the satellite, and thus the unmanned aerial vehicle 20 may acquire the current time information based on signals detected by the GPS sensor 24C.

3-6. Arrival Determination Module

The controller 21 mainly implements the arrival determination module 55. The arrival determination module 55 determines whether or not the unmanned aerial vehicle 20 has arrived at the delivery destination based on the aerial vehicle position information on the position of the unmanned aerial vehicle 20 and the location information. Similarly to the terminal position information, the aerial vehicle position information is only required to be information capable of identifying the position of the unmanned aerial vehicle 20. In this embodiment, a description is given of a case of using the latitude/longitude information detected by the GPS sensor 24C of the unmanned aerial vehicle 20 as the aerial vehicle position information, but information (e.g., access point information on wireless LAN) on a base station to/from which the aerial vehicle 20 wirelessly communicates may be used as the aerial vehicle position information. The arrival determination module 55 determines whether the position indicated by the aerial vehicle position information and the position indicated by the location information match each other or are close to each other. The term "close" herein refers to a state in which a distance between those positions is smaller than a threshold value.

3-7. Checking Module

The controller 21 mainly implements the checking module 56. When the arrival determination module 55 determines that the unmanned aerial vehicle 20 has arrived at the delivery destination, the checking module 56 checks whether or not the user is at the delivery destination based on the authentication information (e.g., authentication image data) associated with the package, the situation of the delivery destination detected by the unmanned aerial vehicle 20, or details of communication to/from the terminal 30. In this embodiment, the notification module 52 notifies the user of the authentication information, and thus the checking module 56 performs checking based on the authentication information notified by the notification module 52. The checking module 56 performs two types of checking, namely, checking of whether or not the person is a valid user and checking of whether or not the user is at the delivery destination.

The situation of the delivery destination is information acquired visually or aurally at the delivery destination, and is only required to be information detectable optically or electrically by the sensor group 24 at the delivery destination. For example, an image (still image or moving image) photographed by the camera 24A or sound detected by a microphone of the sensor group 24 corresponds to the situation of the delivery destination. The checking module 56 determines whether or not the situation of the delivery destination satisfies a predetermined determination criterion, to thereby check whether or not the user is at the delivery destination.

Details of communication to/from the terminal 30 are data transmitted/received through direct/indirect communication between the unmanned aerial vehicle 20 and the terminal 30. Indirect communication means communication between the unmanned aerial vehicle 20 and the terminal 30 via another computer, for example, the server 10. The checking module 56 determines whether or not the details of communication to/from the terminal 30 satisfy the predetermined determination criterion, to thereby check whether or not the user is at the delivery destination.

In this embodiment, a description is given of a case in which the checking module 56 performs checking based on the situation of the delivery destination. For example, the checking module 56 performs checking based on a photographed image obtained by photographing the situation of the delivery destination by the camera 24A. The checking module 56 performs checking by determining whether or not the photographed image contains a predetermined object. The object is an object or an image for verifying the validity of the user, and in this embodiment, a description is given of a case in which the object is an authentication image displayed on the terminal 30.

Figure 6:
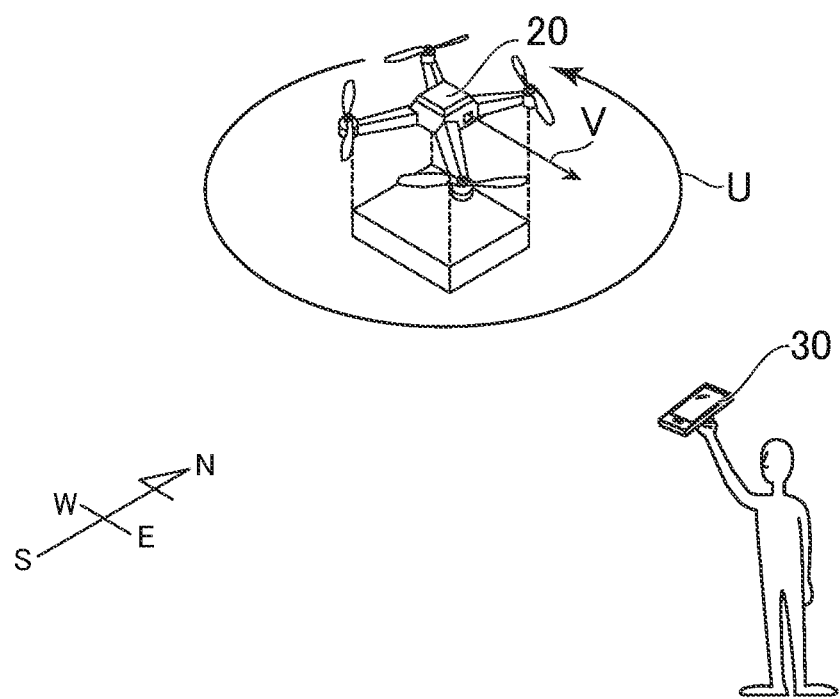
FIG. 6 is a diagram for illustrating a situation in which an unmanned aerial vehicle photographs an image.

FIG. 6 is a diagram for illustrating a situation in which the unmanned aerial vehicle photographs an image. As illustrated in FIG. 6, when the unmanned aerial vehicle 20 arrives at the delivery destination, the unmanned aerial vehicle 20 hovers in the air and photographs the situation of the surroundings by the camera 24A. When the unmanned aerial vehicle 20 arrives at the delivery destination before the delivery date/time, the unmanned aerial vehicle 20 may wait in the air until the delivery date/time. The unmanned aerial vehicle 20 is only required to photograph one or more locations of the delivery destination, but now a description is given based on the assumption that the unmanned aerial vehicle 20 photographs images in all the directions while rotating in a horizontal direction U at the delivery destination. Characters of N, E, S, and W of FIG. 6 represent north, east, south, and west directions, respectively. The unmanned aerial vehicle 20 generates a photographed image for each photographing direction V (east, west, south, and north) to record the photographed image into the storage 22. The photographing direction V may be identified by a gyro sensor or geomagnetic sensor of the sensor group 24.

Figure 7:
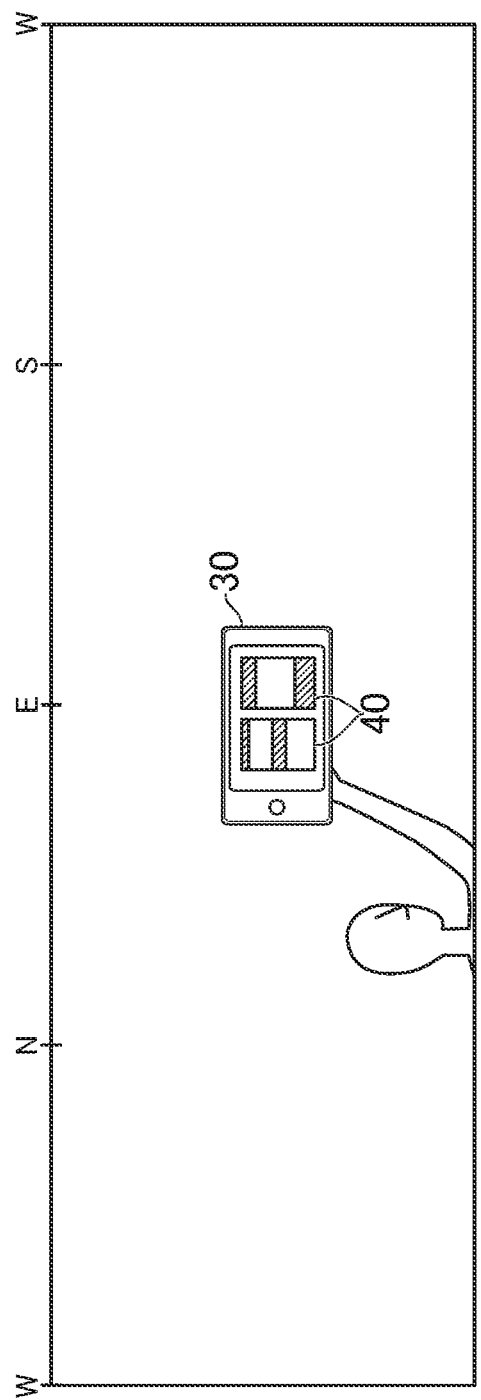
FIG. 7 is an example of a photographed image.

FIG. 7 is an example of the photographed image. In FIG. 7, a description is given of the photographed image as a 360 degree panorama image obtained by connecting photographed images in respective photographing directions (represented by characters of N, E, S, and W in FIG. 7). The checking module 56 performs checking by determining whether or not the photographed image contains the authentication image 40 displayed on the terminal 30. The determination may be performed by using various known template matching methods. The photographed image is used as an inspection image, and the authentication image 40 contained in the delivery instruction is used as a template image. For example, the checking module 56 conducts pattern matching on each region of the photographed image and the authentication image 40 serving as a template image to calculate a degree of similarity therebetween. As the similarity degree becomes higher, those images are indicated to be more similar to each other, and as the similarity degree becomes lower, those images are indicated to be less similar to each other. The similarity degree may be calculated based on a difference between those pixel values. For example, as the difference between pixel values becomes smaller, the similarity degree becomes higher. The checking module 56 determines that the authentication image 40 is photographed within a region (in photographed image in east direction in FIG. 7) for which the similarity degree is equal to or larger than a threshold value.

3-8. Position Estimation Module

The controller 21 mainly implements the position estimation module 57. The position estimation module 57 estimates the position of the user at the delivery destination. The unmanned aerial vehicle 20 can use the GPS sensor 24C to move closer to the user to some extent, but the accuracy of the position detectable by the GPS sensor 24C is limited, and thus the position estimation module 57 estimates a more accurate position of the user. The position of the user estimated by the position estimation module 57 may be an absolute position on the earth, or may be a position of the user relative to the unmanned aerial vehicle 20. In this embodiment, the position estimation module 57 estimates a positional relationship between the unmanned aerial vehicle 20 and the user as a relative position.

In this embodiment, the position estimation module 57 estimates the position of the user based on a photographed image obtained by photographing the situation of the delivery destination by the camera 24A. As described above, the unmanned aerial vehicle 20 generates a photographed image for each photographing direction, and records the photographed image into the storage 22. Thus, the position estimation module 57 estimates the position of the user based on the photographing direction of the photographed image containing the authentication image. In the example of FIG. 7, the authentication image is contained in the image photographed in the east direction among the four directions, and thus the estimation module estimates that there is the user in the east direction as viewed from the unmanned aerial vehicle 20.

For example, the position estimation module 57 may estimate the position of the user based on the position of the authentication image in the photographed image. In this case, the center point of the photographed image is a point of gaze (focal point) of the camera 24A, and thus the position estimation module 57 estimates the position of the user so that deviation between the center point of the photographed image containing the authentication image and the photographing position of the authentication image corresponds to deviation between the point of gaze of the camera 24A and the position of the user. For example, the position estimation module 57 estimates, as the position of the user, a position to which the point of gaze of the camera 24A has moved by a vector from the center point of the photographed image to the photographing position of the authentication image. The point of gaze of the camera 24A may be estimated based on the settings of photography. For example, the position estimation module 57 sets, as the point of gaze, a position away from the camera 24A by a distance corresponding to the focus at the time of photography in the photographing direction. In this case, the setting information on the camera 24A at the time of photography is stored in the storage 22.

3-9. Movement Control Module

The controller 21 mainly implements the movement controller 58. When the checking module 56 finishes checking, the movement controller 58 moves the unmanned aerial vehicle 20 toward the user at the delivery destination. The phrase "toward the user" refers to a direction of the distance between the unmanned aerial vehicle 20 and the user becoming smaller than before movement (for example, when unmanned aerial vehicle 20 has photographed image by camera 24A). In this embodiment, the movement controller 58 moves the unmanned aerial vehicle 20 based on the position estimated by the position estimation module 57. That is, the movement controller 58 moves the unmanned aerial vehicle 20 so that the unmanned aerial vehicle 20 moves toward the position estimated by the position estimation module 57. The movement controller 58 may identify a direction toward the position estimated by the position estimation module 57 based on the detection signal of the geomagnetic sensor or gyro sensor, and move the unmanned aerial vehicle 20 by a predetermined distance in that direction.

4. Processing to be Executed by Logistics System

Figure 8:
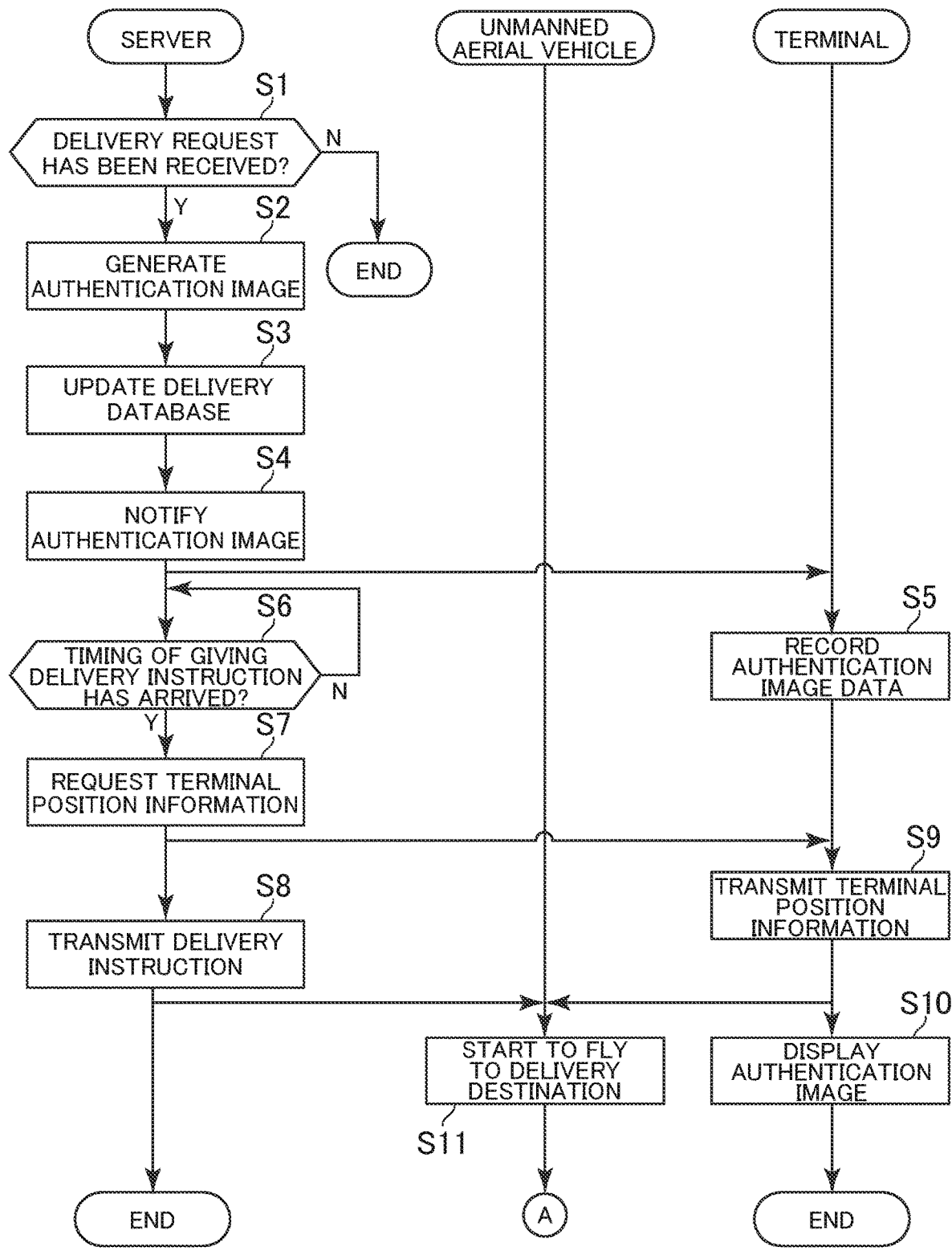
FIG. 8 is a flowchart for illustrating an example of processing to be executed by the logistics system.
Figure 9:
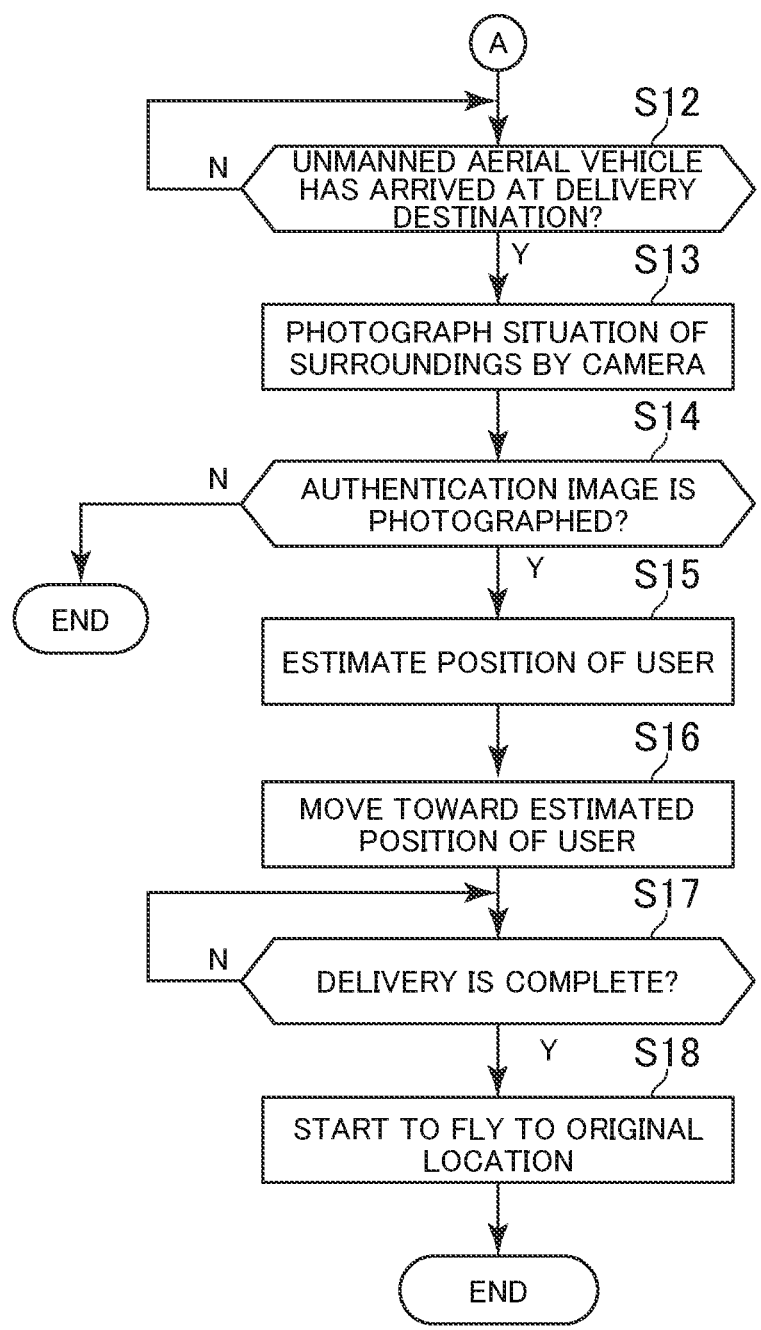
FIG. 9 is a flowchart for illustrating an example of the processing to be executed by the logistics system.

FIG. 8 and FIG. 9 are flowcharts for illustrating an example of processing to be executed by the logistics system 1. The processing illustrated in FIG. 8 and FIG. 9 is executed by the controllers 11, 21, and 31 operating in accordance with programs stored in the storages 12, 22, and 32, respectively. In this embodiment, the functional blocks illustrated in FIG. 4 are implemented through execution of processing described below.

As illustrated in FIG. 8, first, the server 10 determines whether or not the controller 11 has received a request for delivering a package by the requester (Step S1). Delivery is only required to be requested in a predetermined data format, and for example, an employee of the carrier who has visited the requester for collection inputs, into a computer, details of a delivery request filled in by the requester at the time of leaving the package to the carrier so that delivery is requested. It is assumed that the delivery request contains the requester information, the location information, the user information, and the delivery date/time information.

When it is determined that the delivery request is received (Step S1: Y), the controller 11 generates an authentication image (Step S2). In Step S2, the controller 11 generates the authentication image based on a predetermined generation rule. A plurality of patterns of authentication images may be prepared in advance and stored into the storage 22, and an authentication image may be selected at random so as to avoid using the one already used in other delivery.

The controller 11 determines the unmanned aerial vehicle 20 in charge of delivery and updates the delivery database (Step S3). In Step S3, the controller 11 issues a new delivery ID, associates the requester information, location information, user information, and delivery date/time information received in Step S1, and the authentication image data and the unmanned aerial vehicle ID of the unmanned aerial vehicle 20 in charge of delivery generated in Step S2 with one another, and registers those associated pieces of information with the delivery database.

The controller 11 notifies the user of the authentication image generated in Step S2 based on the user information (Step S4). In Step S4, the controller 11 identifies the address of the user based on the user information, and transmits the authentication image data to the destination. For example, when an email is used, the controller 11 may transmit an attached file including the authentication image data together with a message, for example, the delivery date/time, or may transmit the email including a URL on the server 10 registering the authentication image data.

The controller 31 of the terminal 30 records the received authentication image data into the storage 32 (Step S5). In Step S5, when the authentication image data is recorded into the storage 32, the controller 31 can display the authentication image on the display 35 in accordance with, for example, an operation of the user.

The controller 11 refers to the delivery database to determine whether or not a timing of giving a delivery instruction has arrived (Step S6). The timing of giving a delivery instruction may be a timing determined in advance, and may be determined depending on tasks of the carrier. For example, the timing of giving a delivery instruction may be, for example, a date/time a predetermined time before the delivery date/time or a timing of arrival of the package at a collection center nearest to the user.

When the timing of giving a delivery instruction is determined to have arrived (Step S6: Y), the controller 11 refers to the delivery database to request the terminal 30 of the user for the terminal position information (Step S7), and transmits the delivery instruction to the unmanned aerial vehicle 20 in charge of delivery (Step S8). In Step S7, the controller 11 requests the terminal 30 of the user to transmit the terminal position information detected by the GPS sensor 36 to the unmanned aerial vehicle 20. The terminal position information may be transmitted from the terminal 30 to the unmanned aerial vehicle 20 via the server 10, but in this description, the terminal 30 directly transmits the terminal position information to the unmanned aerial vehicle 20. Thus, the request for the terminal 30 contains address information on the unmanned aerial vehicle 20 (e.g., email address, individual identification information, or IP address). In Step S8, the controller 11 transmits a delivery instruction including the location information, the user information, the authentication image data, and the delivery date/time information to the unmanned aerial vehicle 20 of the unmanned aerial vehicle ID in charge of delivery.

When the terminal 30 has received the request for terminal position information, the controller 31 transmits the terminal position information detected by the GPS sensor 36 to the unmanned aerial vehicle 20 (Step S9). It is assumed that the terminal 30 has settings to allow provision of the terminal position information in advance. After that, the terminal 30 periodically transmits the terminal position information to the unmanned aerial vehicle 20. The controller 31 displays the authentication image on the display 35 based on the authentication image data received in Step S5 (Step S10). The authentication image may not be displayed automatically as in Step S10, but may be displayed in accordance with an operation of the user.

When the unmanned aerial vehicle 20 receives the delivery instruction and the terminal position information, the controller 21 starts to fly to the delivery destination (Step S11). A method of flying to a specified location by the unmanned aerial vehicle 20 may be performed by a known automatic maneuvering method. For example, the unmanned aerial vehicle 20 may set the aerial vehicle position information detected by the GPS sensor 24C as the current location, and set the terminal position information received from the terminal 30 as the destination location to automatically fly. Then, the unmanned aerial vehicle 20 may control the propeller so that the direction from the current location toward the destination location is the progress direction. The progress direction may be determined by using the direction obtained from the geomagnetic sensor of the sensor group 24.

Referring to FIG. 9, the controller 21 determines whether or not the unmanned aerial vehicle 20 has arrived at the delivery destination (Step S12). In Step S12, the controller 21 determines whether or not the aerial vehicle position information match the terminal position information. When it is determined that the unmanned aerial vehicle 20 has arrived at the delivery destination (Step S12: Y), the controller 21 performs hovering control so as to maintain a fixed level of height, and photographs the surroundings of the camera 24A (Step S13). When the user confirms that the unmanned aerial vehicle 20 has arrived at the delivery destination, the user directs the terminal 30 displaying the authentication image toward the unmanned aerial vehicle 20. In Step S13, the controller 21 records the photographing direction and photographed image detected by the sensor group 24 into the storage 22 in association with one another.

The controller 21 determines whether or not the photographed image acquired in Step S13 contains the authentication image (Step S14). In Step S14, the controller 21 executes determination processing by executing template matching as described above based on the authentication image data contained in the delivery instruction. When the photographed image is not determined to contain the authentication image (Step S14: N), the processing ends. In this case, the user is not at the delivery destination, and thus the unmanned aerial vehicle 20 brings the package back to a departure point. The latitude/longitude information on the departure point may be stored in the storage 22 in advance. In this case, the controller 21 sets the departure point as the destination location to start to fly.

When the photographed image is determined to contain the authentication image (Step S14: N), the controller 21 estimates the position of the user based on the position of the authentication image contained in the photographed image (Step S15). In Step S15, the controller 21 estimates the position of the user based on the photographing direction of the photographed image and a vector connecting the center point of the photographed image and the photographing position of the authentication image. The controller 21 moves the unmanned aerial vehicle 20 toward the position of the user estimated in Step S16 (Step S16). After that, when the unmanned aerial vehicle 20 approaches a location within reach of a receiver, the receiver receives the package stored in the storage portion of the unmanned aerial vehicle 20.

The controller 21 determines whether or not delivery of the package is complete (Step S17). Completion of delivery may be determined by an operation of the user, or the unmanned aerial vehicle 20 may determine completion of delivery based on a result of detection by the sensor group 24. When an operation of the user is used, a predetermined operation on the terminal 30 causes transmission of data indicating completion of reception of the package to the unmanned aerial vehicle 20. The unmanned aerial vehicle 20, which has received the data, determines completion of delivery. Meanwhile, when the unmanned aerial vehicle 20 determines completion of delivery, the unmanned aerial vehicle 20 may determine whether or not the weight detected by a weight sensor of the sensor group 24 has decreased.

When completion of delivery is determined (Step S17: Y), the controller 21 transmits a delivery completion notification indicating that delivery is complete to the server 10, starts to fly to the original location (Step S18), and ends the processing.

According to the logistics system 1 described above, the unmanned aerial vehicle 20 confirms that the user is at the delivery destination, and then moves toward the user. Therefore, it is possible to prevent the unmanned aerial vehicle 20 from approaching a third person at the delivery destination and erroneously passing the package to the third person, and when the unmanned aerial vehicle 20 is used to deliver a package, the user can reliably receive the package at the delivery destination. Further, for example, when the unmanned aerial vehicle 20 identifies the destination location with use of, for example, a sheet of paper printing a predetermined mark irrespective of the package as a sign, a person who does not have a right to receive the package may impersonate the user to receive the package, or the unmanned aerial vehicle 20 may erroneously deliver the package to a location with a sign of an adjacent house, resulting in theft or erroneous delivery of the package. The logistics system 1 performs checking based on the authentication information associated with the package, and thus it is possible to prevent theft and erroneous delivery.

Further, the authentication information associated with the package is notified to the user in advance, and it is checked whether or not the user is at the delivery destination based on the notified authentication information. Therefore, it is possible to prevent a third person from erroneously receiving the package.

Further, through use of the authentication image as the authentication information, the user is only required to display the authentication image on the terminal 30 to check whether or not the user is at the delivery destination, and thus the unmanned aerial vehicle 20 can perform checking without causing the user to perform a complicated operation. Further, the authentication image is transmitted only to the user, and thus it is possible to prevent the unmanned aerial vehicle 20 from erroneously recognizing an object and approaching a third person, and enhance the probability of the user receiving the package at the delivery destination.

Further, a photographed image that allows grasp of the situation of the delivery destination in detail is used to estimate the position of the user, and thus it is possible to estimate the position of the user more accurately. Thus, it is possible to cause the unmanned aerial vehicle 20 into which the package is loaded to approach a range of reach of the user, and thus it is possible to save the labor of the user at the time of reception of the package.

Further, the terminal position information is set as the delivery destination, and thus the unmanned aerial vehicle 20 into which the package is loaded can be moved closer to the user. Thus, the user is not required to move to the delivery destination, and it is possible to save the labor of the user at the time of reception of the package. In another expression, the user can receive the package anywhere in principle as long as the user is at a location to which the terminal position information can be transmitted, and thus, for example, the user can receive the package without feeling bothered to wait at home caring about the delivery date/time. Further, when the delivery destination is, for example, a predetermined address, a third person may wait at the location and steal the package. However, the unmanned aerial vehicle 20 delivers the package to the location of the terminal 30, and thus it is also possible to prevent a third person from stealing the package.

5. Modification Examples

The present invention is not limited to the embodiment described above, and can be modified suitably without departing from the spirit of the present invention.

Figure 10:
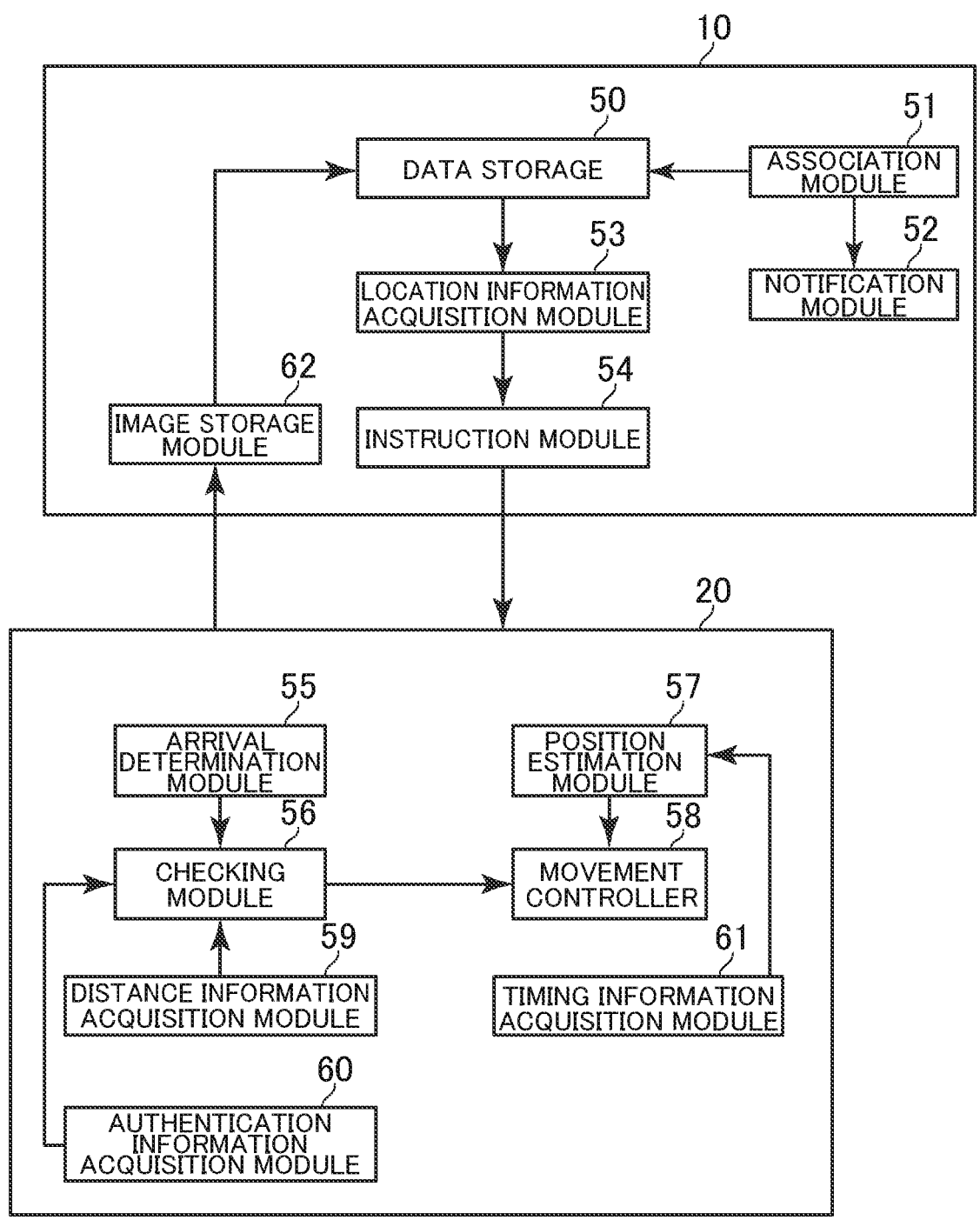
FIG. 10 is a functional block diagram in modification examples of the present invention.

FIG. 10 is a functional block diagram in modification examples of the present invention. As illustrated in FIG. 10, in the modification examples of the present invention described below, a distance information acquisition module 59, an authentication information acquisition module 60, a timing information acquisition module 61, and an image storage module 62 are implemented in addition to the functions of the embodiment. Now, a description is given of a case in which the unmanned aerial vehicle 20 implements the distance information acquisition module 59, the authentication information acquisition module 60, and the timing information acquisition module 61, and the server 10 implements the image storage module 62.

(1) For example, in the description of the embodiment, an object to be used for checking the user is the authentication image, but the object may be the user himself or herself. In this modification example, the authentication information is appearance information on an appearance of the user. A delivery database in Modification Example (1) of the present invention stores the appearance information on the appearance of the user. The appearance information is information indicating characteristics of the appearance of the user, and for example, is information indicating, for example, the face, eyes, hairstyle, body type, outline, height, or clothes of the user, or the posture (posing) to be taken by the user to receive the package. The appearance information may be image data, or information indicating only the characteristics of the shape or color. Now, a description is given of a case in which the appearance information is image data obtained by photographing the face of the user. In this case, the terminal 30 may include a camera, and the camera of the terminal 30 may be used to generate the appearance information, or a camera connected to the terminal 30 may input the appearance information into the terminal 30. For example, the user may operate the terminal 30 or another computer to upload the appearance information onto the server 10, and the association module 51 may receive the uploaded appearance information for storage into the delivery database in association with the package.

The checking module 56 in Modification Example (1) determines whether or not the photographed image contains the user based on the appearance information on the appearance of the user. For example, when the appearance information is image data, the checking module 56 may execute template matching by using the appearance information as a template image. That is, the checking module 56 determines whether or not a subject having a similarity degree with the appearance information of a threshold value or more is photographed in the photographed image. For example, when the face of the user is used as the appearance information, the checking module 56 may use a known face recognition algorithm. In other cases, for example, when the eyes of the user are used as the appearance information, the checking module 56 may use a known retina scanning method or iris recognition method. Alternatively, various kinds of biometric authentication methods using photographed images are available.

When the appearance information is color information on clothes, the checking module 56 prepares in advance a template image representing the shape of clothes, and identifies a region in which clothes are photographed in the photographed image using template matching. Then, the checking module 56 refers to a pixel value of the identified region to determine whether or not a color indicated by the pixel value matches or is similar to a color indicated by the appearance information. Colors are determined to be similar to each other when a difference between pixel values is smaller than the threshold value. When the color indicated by the pixel value is determined to match or is similar to the color indicated by the appearance information, the checking module 56 determines that the user is contained in the photographed image.

According to Modification Example (1), the user uses the appearance information on the user to check whether or not the user is at the delivery destination, and thus it is possible to improve the accuracy of checking. For example, when the authentication image is stolen, it means that a third person can impersonate the user to receive the package. However, through use of the appearance information, it is possible to prevent a third person from impersonating the user to enhance a security level. As a result, it is possible to effectively enhance the probability of the user receiving the package at the delivery destination. Further, from the viewpoint of the user, the authentication image is not required to be prepared, and thus it is possible to save the labor at the time of reception of the package.

(2) Further, for example, whether or not the user is at the delivery destination may be checked not only based on one photographed image, but based on photographed images obtained by photographing the situation of the delivery destination for a fixed period of time. In this case, the terminal 30 may switch between a plurality of authentication images in a given order, and use the display order for checking.

In Modification Example (2) of the present invention, the camera 24A continuously or repeatedly photographs the situation of the delivery destination. The camera 24 periodically photographs an image at a predetermined framerate, or photographs an image irregularly without particularly defining a framerate. The camera 24A may photograph an image at each of a plurality of time points, photograph an image for a fixed period of time in a moving image mode, photograph an image in a continuous shooting mode of a still image, or repeatedly photograph an image in a still image mode. When an image is photographed in the still image mode, the unmanned aerial vehicle 20 records a photographed image being a moving image into the storage 22, records the photographed image and photographing time into the storage 22 in association with each other, or records photographed images into the storage 22 in chronological order.

The checking module 56 in Modification Example (2) performs checking by determining whether images photographed continuously or repeatedly by the camera 24A contain a predetermined pattern of changes. The predetermined pattern of changes is a pattern of visual changes exhibited as an image in the photographed images, and is, for example, a change in object or light. For example, the predetermined pattern of changes may be switching between a plurality of authentication images in a predetermined display order, may be switching therebetween at a predetermined timing, or may be a combination thereof. At least one of the shape, pattern, color, or size is only required to be different from each other in respective authentication images, and the information amount may be the same or different from each other in those authentication images.

In this modification example, it is assumed that the delivery database stores a plurality of authentication images and data (namely, data indicating predetermined pattern of changes) on its display order and timings of switching display. This data may be moving image data, or may be data for reproducing still images in a predetermined order by using, for example, a slide-show mode. The server 10 transmits the data to the unmanned aerial vehicle 20 and the terminal 30. The terminal 30 switches between the plurality of authentication images in a predetermined display order and at switching timings based on the received data. After the terminal 30 displays an authentication image last in display order, the terminal 30 may display an authentication image first in display order again to repeat the reproduction of the images.

Figure 11:
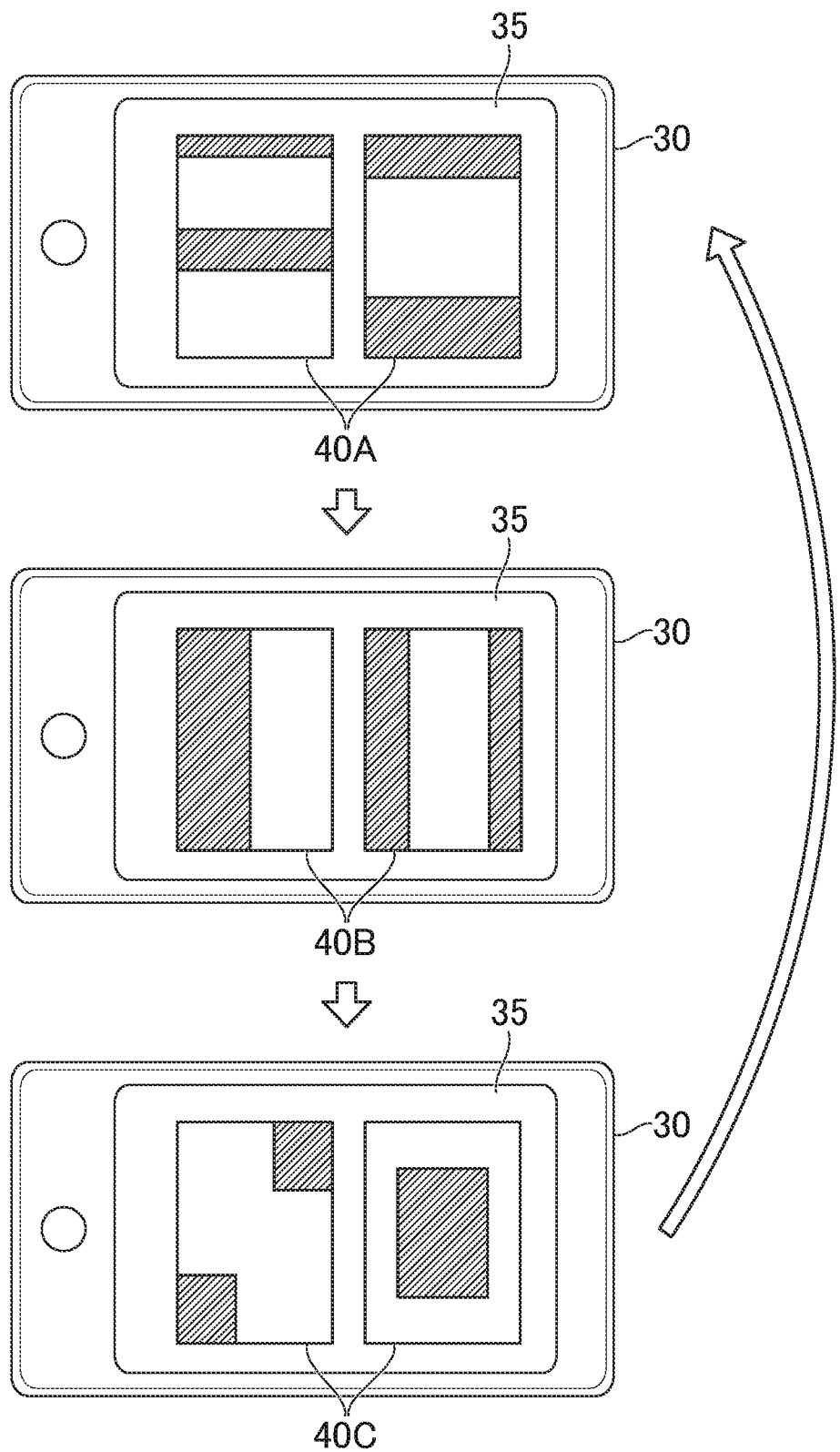
FIG. 11 is a diagram for illustrating a situation in which authentication images switch on a terminal.

FIG. 11 is a diagram for illustrating a situation in which authentication images switch on the terminal 30. As illustrated in FIG. 11, the terminal 30 switches between three authentication images 40A to 40C with different patterns in a predetermined order. For example, when the terminal 30 displays the authentication image 40A for a first period, the terminal 30 switches the authentication image 40A to the authentication image 40B. Then, after the terminal 30 displays the authentication image 40B for a second period, the terminal 30 switches the authentication image 40B to the authentication image 40C. Further, after the terminal 30 displays the authentication image 40C for a third period, the terminal 30 switches the authentication image 40C to the authentication image 40A again. After that, the terminal 30 may switch display of the authentication images 40A, 40B, and 40C in the stated order to repeat the reproduction of the images. The first to third periods may be the same length, or may be different lengths. Further, although the three authentication images 40A to 40C have been described, two authentication images or four or more authentication images may be switched.

The checking module 56 determines whether or not the situation in which the plurality of authentication images switch at a predetermined timing in a predetermined display order is photographed based on the data received from the server 10 and the photographed images continuously or repeatedly photographed. When the determination result is affirmative, the checking module 56 determines that the user is at the delivery destination. The authentication images and its display order are not required to exactly match, and may partially match. For example, even when not all the plurality of authentication images and its display order do not match, the checking module 56 may determine that the authentication images and its display order match when a reference number or more of those authentication images and its display order match. Further, the timing of switching between the authentication images is not required to match exactly, and the checking module 56 may determine that the timing matches when a temporal deviation is smaller than the threshold value.

According to Modification Example (2), it is determined whether or not the photographed images contain the predetermined pattern of changes, and thus it is possible to complicate information for checking whether or not the user is at the delivery destination to enhance the security level. As a result, it is possible to prevent a third person from impersonating the user and occurrence of erroneous authentication, to thereby effectively enhance the probability of the user receiving the package at the delivery destination.

The predetermined pattern of changes is only required to be a pattern detectable in the photographed images, and a change other than that in authentication images may be used. For example, when the terminal 30 includes an emitter, for example, an LED light, a timing (blinking timing) of switching between on (switching light on) and off (switching light off) may be used as the predetermined pattern of changes. Data indicating this timing may be stored into the delivery database, and the server 10 may transmit the data to the unmanned aerial vehicle 20 and the terminal 30. The terminal 30 controls on/off of the emitter based on the data. The user may direct the emitter toward the unmanned aerial vehicle 20 at the delivery destination. In this case, the checking module 56 first identifies the position of the emitter photographed in the photographed image. For example, the checking module 56 may detect a region having a predetermined pixel value as the position of the emitter. This pixel value may be determined based on the emission color, and for example, may be a pixel value indicating a whitish color, a reddish color, or a greenish color. The checking module 56 acquires the timing at which the identified pixel value of the position of the emitter has changed as the timing of switching between on/off of the emitter. Then, the checking module 56 may compare the acquired timing with the timing indicated by the data received from the server 10 to determine whether or not those timings match each other. This match is also not required to be an exact match, and a temporal deviation smaller than a threshold value may be allowed. The emitter is not required to be included in the terminal 30, and for example, a flashlight or penlight held by the user may correspond to the emitter. In this case, the user manually switches on/off of the emitter. The switching pattern may be notified in advance to the user by using, for example, an email.

In other cases, for example, the order of change of a plurality of colors and its timing may be used as the predetermined pattern of changes. In this case, the display 35 may be used to display a plurality of colors as the authentication images, or the emitter may be used when the emitter of the terminal 30 can emit a plurality of colors of light. Processing to be executed when the authentication image is used is similar to that described in Modification Example (2), and for example, the similarity of only the color may be determined without consideration of whether or not image patterns are similar to each other. Meanwhile, when the emission color of the emitter is switched, data indicating the emission color, emission order, and switching timing may be stored into the delivery database, and the server 10 may transmit the data to the unmanned aerial vehicle 20 and the terminal 30. The terminal 30 switches the emission color of the emitter based on the data in a predetermined order (e.g., "white", "red", and "green" in stated order). Similarly to the above-mentioned method, the checking module 56 may identify the position of the emitter, and acquire the color of the position, emission order, and switching timing for comparison with the emission color, emission order, and switching timing indicated by the data received from the server 10 to determine whether or not those colors, emission orders, and switching timings match each other. This match is also not required to be an exact match, and deviations in color, emission order, and time smaller than threshold values may be allowed. Not both of the order in change of colors and its timing but any one thereof may be used as the predetermined pattern of changes.

Further, for example, gestures of the user may be used as the predetermined pattern of changes by combining Modification Examples (1) and (2). In this case, it is assumed that the delivery database stores a motion pattern indicating a predetermined motion performed by a person. This motion pattern may be, for example, an animation of a human model. The server 10 transmits data indicating the motion pattern to the unmanned aerial vehicle 20 and the terminal 30 in advance. The user displays the motion pattern transmitted to the terminal 30 on the display 35, and when the unmanned aerial vehicle 20 arrives at the delivery destination, the user performs the same gesture as that of the motion pattern. The unmanned aerial vehicle 20 may analyze the gesture of the user from the photographed image, and determine whether or not the gesture matches the motion pattern received from the server 10. A known gesture recognition algorithm may be used for analysis of the gesture. This match is not required to be an exact match, but a certain degree of deviation may be allowed.

(3) Further, for example, when the unmanned aerial vehicle 20 is away from the user, the situation near the user is not photographed clearly and the accuracy of image analysis is low. In such a case, whether or not there is the user may be checked in a simplified manner, and when the unmanned aerial vehicle 20 approaches the user and can photograph the situation of the surroundings of the user clearly, the unmanned aerial vehicle 20 may perform detailed checking.

The unmanned aerial vehicle 20 in Modification Example (3) of the present invention includes the distance information acquisition module 59. The controller 21 mainly implements the distance information acquisition module 59. The distance information acquisition module 59 acquires distance information on a distance between the unmanned aerial vehicle 20 and the user. The distance information indicates an estimated value of a distance between the unmanned aerial vehicle 20 and the user or the terminal 30 held by the user. The distance information acquisition module 59 periodically acquires the distance information. Various known techniques are applicable to a method of estimating the distance between objects, and the distance is estimated by an electromagnetic or optical technique.

For example, the distance information acquisition module 59 acquires the distance information based on a detection signal of the infrared sensor 24B. The distance information acquisition module 59 acquires the distance information based on a flight time taken for an infrared ray, which is emitted by the distance information acquisition module 59 from the infrared sensor 24B toward the position of the user estimated by the position estimation module 57, to be reflected by an object (user or object estimated to be terminal 30) in that direction and return to the unmanned aerial vehicle 20.

When short-range communication is possible between the unmanned aerial vehicle 20 and the terminal 30, the distance information acquisition module 59 acquires the distance information based on a communication state of the communicator 23. Short-range communication is wireless communication to be performed by using a predetermined frequency band, and frequency bands of several centimeters to tens of meters may be used as the communication area. Any standard of short-range communication may be employed, such as Bluetooth (trademark) or a wireless LAN. The unmanned aerial vehicle 20 and the terminal 30 may establish communication in accordance with a procedure defined in the standard of short-range communication. The distance information acquisition module 59 acquires the distance information based on the strength of a radio wave of short-range communication.

Alternatively, the distance information acquisition module 59 may acquire the distance information based on the photographed image of the camera 24A. In this case, the distance information acquisition module 59 acquires the distance information based on the size (number of pixels) occupied by a predetermined subject in the photographed image. The subject is, for example, the terminal 30, the authentication image, or the user. The predetermined subject may be identified by using pattern matching between the predetermined subject and a template image of the basic shape. The template image may be stored in the storage 22 in advance. As the size of the subject in the photographed image becomes smaller, the distance information acquisition module 59 determines that the distance information indicates a larger distance, whereas as the size of the subject in the photographed image becomes larger, the distance information acquisition module 59 determines that the distance information indicates a smaller distance. A relationship between the size of the subject and the distance information may be determined in a mathematical expression format or table format, and stored into the storage 22 in advance. Further, for example, when the camera 24A includes a distance image sensor configured to photograph a distance image by a time-of-flight (TOF) method, the distance information acquisition module 59 may acquire the distance information based on the distance image photographed by the camera 24A. In this case, the camera 24A uses, for example, a phase difference of light, to measure a period of time taken for light, which is projected for each pixel, to make a round trip, to thereby photograph the distance image.

The checking module 56 in Modification Example (3) performs checking in a stepwise manner based on the distance information. Now, similarly to the embodiment, a description is given of a case in which the checking module 56 determines whether or not the authentication image displayed on the terminal 30 is photographed.

Figure 12:
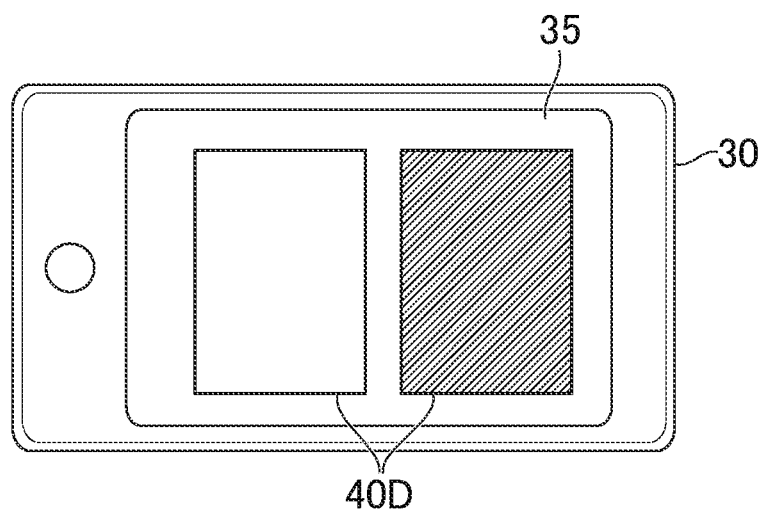
FIG. 12 is a diagram for illustrating details of processing of a checking module in Modification Example (3) of the present invention.
Figure 12:
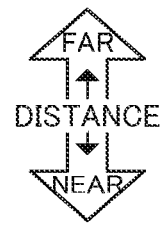
Figure 12:
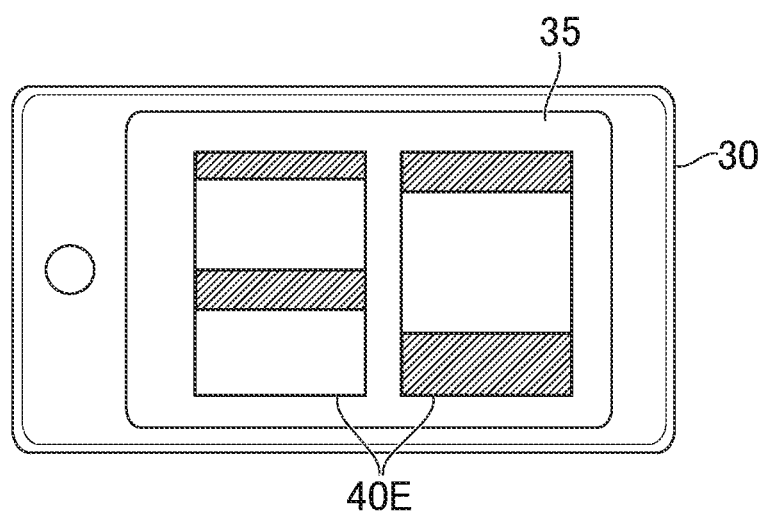

FIG. 12 is a diagram for illustrating details of processing of the checking module 56 in Modification Example (3). As illustrated in FIG. 12, the authentication image changes depending on the distance information. For example, when the distance information indicates a distance smaller than a predetermined distance, the terminal 30 changes the display mode of the authentication image. The terminal 30 acquires the distance information from the distance information acquisition module 59, and determines whether or not the distance information indicates a distance smaller than the predetermined distance. The predetermined distance is a threshold value of the distance. In this description, one threshold value is set, but a plurality of threshold values may be prepared. Changing the display mode means switching an authentication image to be displayed to another authentication image, or changing at least one of the shape, pattern, color, luminance, size, and effect of the authentication image. The effect is an effect to be given to the image, and is a pattern such as rotation, extension, contraction, or blinking of the image. Now, a description is given of a case in which switching the displayed authentication image to another authentication image corresponds to changing the display mode.

As illustrated in FIG. 12, when the distance information indicates a distance smaller than the predetermined distance, the terminal 30 switches a displayed authentication image 40D to a new authentication image 40E with a larger information amount. The information amount indicates the complexity of the authentication image, such as the variety of regions or colors in the image. As the information amount of the authentication image becomes larger, the probability of producing a match by template matching becomes lower, resulting in a higher security level. However, the authentication image with a large information amount is complex, and thus when the unmanned aerial vehicle 20 and the authentication image are away from each other, the authentication image is less likely to be detected from the photographed image. Thus, the terminal 30 switches between a plurality of authentication images for display so that, as the distance indicated by the distance information becomes larger, the information amount of the authentication image becomes smaller, whereas as the distance indicated by the distance information becomes smaller, the information amount of the authentication image becomes larger.

In FIG. 12, a description is given based on the assumption that the two authentication images 40A and 40B are used to perform checking in two steps, but checking may be performed in three or more steps by using three or more authentication images. The terminal 30 displays an authentication image associated with current distance information on the display 35. A relationship between the distance information and the authentication image to be displayed may be stored in the delivery database, and the server 10 transmits data indicating the relationship to the unmanned aerial vehicle 20 and the terminal 30.

The checking module 56 performs checking by determining whether or not the first situation is contained in the photographed image. The first situation refers to the photographed image being in a first state, and for example, means that the authentication image is in a first display mode, the user is in a first state, switching of the authentication image matches a first pattern, switching of on/off of the emitter matches a first pattern, or switching of colors matches a first pattern. The authentication image is used in this description, and thus as illustrated in FIG. 12, the first situation means that the terminal 30 displays the authentication image 40A (example of first display mode). The checking module 56 determines whether or not the photographed image contains the authentication image 40A. This determination may be performed by template matching similarly to the embodiment.

Further, the checking module 56 acquires the distance information from the distance information acquisition module 59, and determines whether or not the distance information indicates a distance smaller than the predetermined distance. When the distance information indicates a distance smaller than the predetermined distance, the checking module 56 determines whether or not a second situation different from the first situation is photographed, to thereby perform checking in a stepwise manner depending on the distance information. The second situation refers to the photographed image being in a second state, and for example, means that the authentication image is in a second display mode, the user is in a second state, switching of the authentication image matches a second pattern, switching of on/off of the emitter matches a second pattern, or switching of colors matches a second pattern. The authentication image is used in this description, and thus as illustrated in FIG. 12, the second situation means that the terminal 30 displays the authentication image 40B (example of second display mode). The checking module 56 determines whether or not the photographed image contains the authentication image 40B. This determination may be performed by template matching similarly to the embodiment.

When checking is performed in three or more steps instead of checking in two steps illustrated in FIG. 12, every time the distance information indicates a distance smaller than the threshold value, the checking module 56 performs checking processing based on the authentication image associated with the current distance information. The checking module 56 may use the authentication image associated with the current distance information as the template image. Further, in the description of this modification example, each of the checking module 56 (unmanned aerial vehicle 20) and the terminal 30 executes processing of determining whether or not the distance information indicates a distance smaller than the predetermined distance, but this processing may be executed by any one of the checking module 56 and the terminal 30, and a determination result may be transmitted to the other side. Alternatively, for example, this processing may be executed by another computer, for example, the server 10, and the determination result may be transmitted to the unmanned aerial vehicle 20 and the terminal 30.

According to Modification Example (3), the display mode of the authentication image is changed based on the distance information, and thus it is possible to check the user by a method that depends on the distance information. As a result, when the unmanned aerial vehicle 20 is away from the user and it is difficult to perform detailed image analysis, a simplified authentication image is used to perform overall checking. Then, when the unmanned aerial vehicle 20 and the user are close enough to each other to allow the detailed image analysis to be performed, a detailed authentication image can be used to perform detailed checking. As a result, it is possible to prevent occurrence of a situation in which the unmanned aerial vehicle 20 cannot confirm the user and the user cannot receive the package because the unmanned aerial vehicle 20 and the user are away from each other even though the user is at the delivery destination, to thereby be able to enhance the probability of the user receiving the package at the delivery destination.

Modification Examples (1) and (3) may be combined. In this case, for example, the checking module 56 may determine whether or not the user is in the first state when the distance information indicates the predetermined distance or more, or may determine whether or not the user is in the second state when the distance information indicates a distance smaller than the predetermined distance. For example, the first state is an upright posture, which is relatively easy to detect, and the second state is a posture of raising both hands, which requires detailed shape analysis. In this case, the user waits in an upright posture when the unmanned aerial vehicle 20 is far away from the user, and raises both hands to send a signal when the unmanned aerial vehicle 20 is close to the user. In this manner, the checking module 56 may check the user by a simple method when the distance information indicates a large distance and by a sophisticated method when the distance information indicates a small distance.

Further, Modification Examples (2) and (3) may be combined. In this case, for example, the checking module 56 may determine whether or not one authentication image is displayed when the distance information indicates the predetermined distance or more, or may determine whether or not a plurality of authentication images switch at a predetermined pattern when the distance information indicates a distance smaller than the predetermined distance. Further, for example, the checking module 56 may determine whether or not the authentication image switches at a first pattern when the distance information indicates the predetermined distance or more, or may determine whether or not the authentication image switches at a second pattern when the distance information indicates a distance smaller than the predetermined distance. In this case, the number of authentication images switching at the second pattern is larger than the number of authentication images switching at the first pattern. The terminal 30 may switch between the authentication images at a pattern that depends on the distance information. In this manner, the checking module 56 may reduce the number of authentication images when the distance information indicates a large distance, or increase the number of authentication images when the distance information indicates a small distance, to thereby check the user.

Further, for example, the checking module 56 may determine whether or not on/off of light emission switches at a first pattern when the distance information indicates the predetermined distance or more, or may determine whether or not on/off of light emission switches at a second pattern when the distance information indicates a distance smaller than the predetermined distance. In this case, the frequency or number of times of switching between on/off of light emission at the second pattern may be set to be larger than that at the first pattern. The terminal 30 or the user may switch between on/off of light emission at a pattern that depends on the distance information. In this manner, the checking module 56 may check the user with a simple on/off method when the distance information indicates a large distance, or may check the user by a sophisticated on/off method when the distance information indicates a small distance.

Further, for example, the checking module 56 may determine whether or not the color switches at a first pattern when the distance information indicates the predetermined distance or more, or may determine whether or not the color switches at a second pattern when the distance information indicates a distance smaller than the predetermined distance. In this case, the frequency or number of colors to be switched at the second pattern may be set to be larger than that at the first pattern. The terminal 30 may switch the number of colors that depends on the distance information. In this manner, the checking module 56 may check the user with a smaller number of colors when the distance information indicates a large distance, or may check the user by a larger number of colors when the distance information indicates a small distance.

Further, for example, the checking module 56 may determine whether or not the user is performing a first gesture when the distance information indicates the predetermined distance or more, or may determine whether or not the user is performing a second gesture when the distance information indicates a di stance smaller than the predetermined distance. In this case, the second gesture is more complicated than the first gesture. A complicated gesture means a larger amount of movement by the user. In this manner, the checking module 56 may check the user with a simple gesture when the distance information indicates a large distance, or may check the user with a complicated gesture when the distance information indicates a small distance.

(4) Further, for example, in the description of Modification Example (3), authentication images are switched depending on the distance information. However, the authentication images may not be particularly switched, and a threshold value for the similarity degree in template matching may be changed depending on the distance information, to thereby perform checking in a stepwise manner. For example, when the distance between the unmanned aerial vehicle 20 and the user is large, the accuracy of image analysis is low, and thus the threshold value may be set lower to ease the standard for determining the similarity. On the other hand, when the unmanned aerial vehicle 20 is close to the user, and the threshold value may be set higher to tighten the standard for determining the similarity.

The checking module 56 performs checking by determining whether or not a degree of similarity between the situation of the delivery destination contained in the photographed image and a predetermined situation is equal to or larger than a threshold value. The predetermined situation is a situation for determining that the user is at the delivery destination, and for example, means that an object is at the delivery destination or changes at a predetermined pattern. In this description, the checking module 56 determines a similarity with an object as in the embodiment and Modification Example (1). Thus, a description is given of a case in which the similarity degree is a similarity degree in template matching.

When the distance information indicates a distance smaller than the predetermined distance, the checking module 56 changes the threshold value, and performs determination based on the changed threshold value, to thereby perform checking in a stepwise manner based on the distance information. For example, when the distance information indicates a distance smaller than the predetermined distance, the checking module 56 increases the threshold value for the similarity degree, and performs template matching again based on the increased threshold value. A relationship between the distance information and the threshold value is stored in, for example, the data storage 50 or the storage 22 in advance. This relationship is defined so that as the distance information indicates a larger distance, the threshold value becomes smaller, whereas as the distance information indicates a smaller distance, the threshold value becomes larger.

According to Modification Example (4) of the present invention, the determination standard can be eased or tightened based on the distance information, and thus it is possible to check the user with a method that depends on the distance information, and obtain an effect similar to that of Modification Example (3). Further, in Modification Example (4), only the threshold value serving as the determination standard is required to be changed, and thus it is not required to prepare a plurality of authentication images. Accordingly, it is possible to perform checking in a stepwise manner with a simpler method.

Through combination of Modification Examples (2) and (4), the checking module 56 may change the threshold value for the degree of similarity with a predetermined pattern. The similarity degree in this case indicates a degree of similarity between the change of the photographed image and the predetermined pattern. For example, the similarity degree indicates whether or not the images are similar to each other, the orders of switching patterns are similar to each other, and the switching timings are similar to each other. As the images, the orders of switching patterns, and the switching timings are more similar to each other, the similarity degree becomes higher. With this configuration, the threshold value can be changed to perform checking in a stepwise manner without preparing a plurality of patterns of change of, for example, the authentication image, and thus it is possible to perform checking with a simpler method.

Further, Modification Examples (3) and (4) may be combined. For example, the checking module 56 may change the authentication image to be used for checking based on the distance information, and at the same time, change the threshold value to be used for template matching. Further, for example, the checking module 56 may change the predetermined pattern to be used for checking based on the distance information, and at the same time, change the threshold value to be used for similarity determination. In this case, as the distance information indicates a larger distance, the condition for checking may be eased, whereas as the distance information indicates a smaller distance, the condition may be tightened.

(5) Further, for example, a description has been given of a case in which the user uses the photographed image to check whether or not the user is at the delivery destination, but another method may be used. For example, details of communication between the unmanned aerial vehicle 20 and the terminal 30 may be used to check whether or not the user is at the delivery destination.

Figure 13:
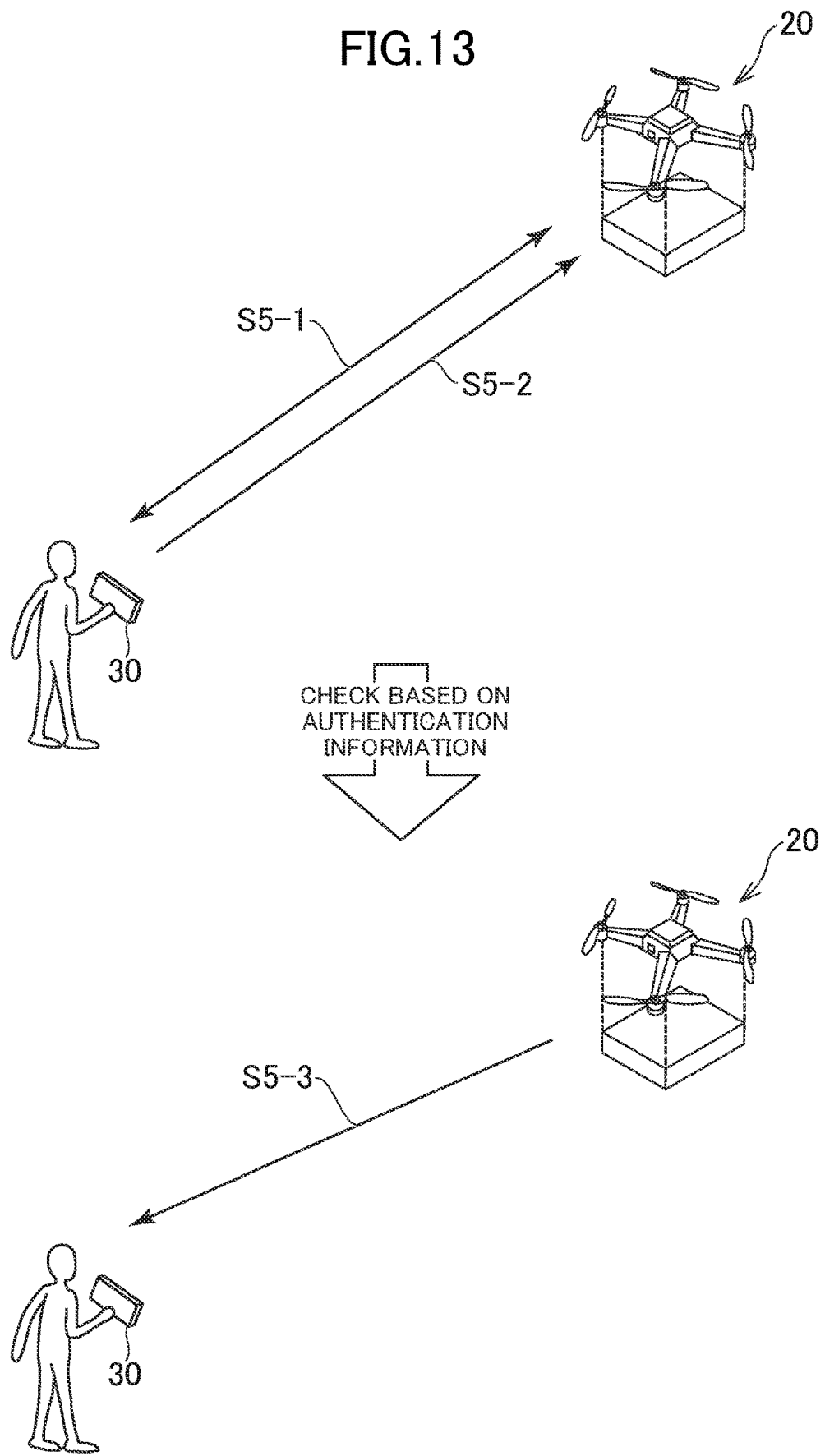
FIG. 13 is a diagram for illustrating an outline of processing of the logistics system in Modification Example (5) of the present invention.

FIG. 13 is a diagram for illustrating an outline of processing of the logistics system in Modification Example (5) of the present invention. As illustrated in FIG. 13, in Modification Example (5), the unmanned aerial vehicle 20 and the terminal 30 can each perform short-range communication. When the unmanned aerial vehicle 20 arrives at the delivery destination and approaches the terminal 30 within a distance allowing short-range communication, connection between the unmanned aerial vehicle 20 and the terminal 30 by short-range communication is established (S5-1 of FIG. 13). In this description, connection by short-range communication may be established in accordance with a procedure defined in a communication standard. A password or the like may be used for establishing short-range communication, or connection may be established without a password like in free Wi-Fi. In this case, authentication information described later may be used as a password for establishing connection.

The unmanned aerial vehicle 20 in Modification Example (5) includes the authentication information acquisition module 60. The controller 21 mainly implements the authentication information acquisition module 60. When the unmanned aerial vehicle 20 and the terminal 30 are connected to each other by short-range communication, the authentication information acquisition module 60 acquires the authentication information from the terminal 30 (S5-2 of FIG. 13). The authentication information is only required to be information to be used for authentication, and may be, for example, the password generated by at least one of characters or numbers, or may be individual identification information (serial number) on the terminal 30. In other cases, for example, the authentication information may be any type of biometric authentication information such as the face or fingerprint of the user. The authentication information may be stored in the storage 32 of the terminal 30 in advance, or the user may input the authentication information into the operation device 34. In other cases, for example, when the biometric authentication information is used, the terminal 30 may include a camera or scanner for reading a part of the user such as the face or fingers.

It is assumed that the authentication information is stored in the delivery database, and contained in a delivery instruction to be transmitted to the unmanned aerial vehicle 20 by the server 10. Thus, it is assumed that the unmanned aerial vehicle 20 holds the authentication information on the user in the storage 22 before arriving at the delivery destination. As described in the embodiment, the notification module 52 may transmit the authentication information to the terminal 30 in advance, but when the biometric authentication information or the individual identification information on the terminal 30 is used as the authentication information, the authentication information is not particularly transmitted in advance. In this case, the authentication information is uploaded in advance to the server 10 from the terminal 30 or another computer operated by the user, and the association module 51 may store the authentication information into the delivery database in association with the package. The checking module 56 in Modification Example (5) performs checking based on the authentication information. The checking module 56 determines whether or not the authentication information received from the terminal 30 via short-range communication and the authentication information stored in the storage 22 match each other. When those pieces of information match each other, the checking module 56 determines that the user is at the delivery destination. Also in this determination, this match is also not required to be an exact match, but may be a partial match. After the checking module 56 performs checking, the unmanned aerial vehicle 20 approaches the user (S5-3 of FIG. 13). In this case, the position of the user may be estimated by using the photographed image similarly to the case of the embodiment.

According to Modification Example (5), it is possible to confirm that the terminal 30 is near the delivery destination by establishing connection via short-range communication, and the authentication information can be used to check the validity of the user, and thus short-range communication can be used to confirm that the user is at the delivery destination. As a result, compared to a case of using the authentication image, it is possible to confirm that the user is at the delivery destination even at a location that is too dark for the camera 24A to photograph an image. As a result, it is possible to effectively enhance the probability of the user receiving the package at the delivery destination.

(6) Further, for example, a description has been given of a case of using the photographed image to estimate the position of the user at the delivery destination, but the position of the user may be estimated based on another method. For example, an electromagnetic wave or sound wave having directivity may be used to estimate the position of the user at the delivery destination.

The unmanned aerial vehicle 20 in Modification Example (6) of the present invention generates an electromagnetic wave or sound wave having directivity in a plurality of directions when the arrival determination module 55 determines that the unmanned aerial vehicle 20 has arrived at the delivery destination. The electromagnetic wave or sound wave to be used may have a different strength depending on the direction, and for example, an infrared ray or an ultrasonic wave may be used. The unmanned aerial vehicle 20 includes a generator for generating the electromagnetic wave or sound wave, and in this description, the infrared sensor 24B corresponds to the generator to use an infrared ray.

Figure 14:
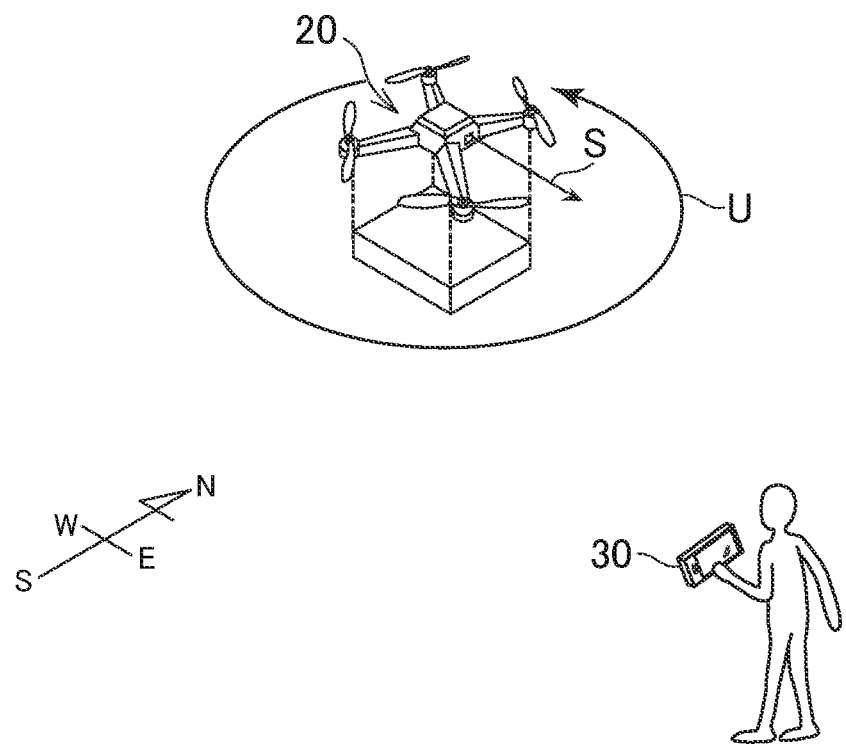
FIG. 14 is a diagram for illustrating a situation in which the unmanned aerial vehicle radiates an infrared ray at a delivery destination.

FIG. 14 is a diagram for illustrating a situation in which the unmanned aerial vehicle radiates an infrared ray at the delivery destination. As illustrated in FIG. 14, when the unmanned aerial vehicle 20 arrives at the delivery destination, the unmanned aerial vehicle 20 hovers in the sky and radiates an infrared ray toward its surroundings while rotating in a horizontal direction U at that location. In this description, the unmanned aerial vehicle 20 radiates an infrared ray in all the directions about the current position, but the unmanned aerial vehicle 20 may radiate an infrared ray in a range of less than 360 degrees. The unmanned aerial vehicle 20 records a timing of radiating an infrared ray in each direction into the storage 22. The unmanned aerial vehicle 20 may radiate an infrared ray, and for example, the geomagnetic sensor or gyro sensor of the sensor group 24 may be used to identify the direction. The unmanned aerial vehicle 20 stores a radiation direction S of the infrared ray into the storage 22 in association with a radiation timing. The radiation timing may be acquired by using a real-time clock of the controller 21.

In Modification Example (6), the terminal 30 includes a receiver of an electromagnetic wave or sound wave having directivity. The receiver may be an infrared ray receiver, an ultrasonic wave receiver, or a directional microphone. Now, a description is given taking the case of an infrared ray as an example, and thus the terminal 30 acquires timing information on a timing at which the receiver has received the infrared ray. The timing information is only required to be information capable of identifying time, and for example, may be a current time acquired by the controller 31 using the real-time clock. The terminal 30 transmits the timing information to the unmanned aerial vehicle 20. It is assumed that the unmanned aerial vehicle 20 and the terminal 30 are synchronized with each other in terms of time in advance. For example, the unmanned aerial vehicle 20 and the terminal 30 may each include a radio clock, and those radio clocks may be synchronized with each other in terms of time.

The unmanned aerial vehicle 20 in Modification Example (6) includes the timing information acquisition module 61. The controller 21 mainly implements the timing information acquisition module 61. The timing information acquisition module 61 acquires timing information on a timing at which the terminal 30 has detected an electromagnetic wave or sound wave. The position estimation module 57 estimates the position of the user based on the timing information. For example, the position estimation module 57 compares the received timing information with the radiation timing of an infrared ray. Then, the position estimation module 57 estimates, as the position of the user, a radiation direction at a radiation timing closest to the received timing information. In this description, the unmanned aerial vehicle 20 and the terminal 30 are synchronized with each other in terms of time, and a period of time for the infrared ray to reach the terminal 30 from the unmanned aerial vehicle 20 is short enough to be ignored, and thus the terminal 30 is estimated to be present in the radiation direction identified by the position estimation module 57. In the following, processing of movement by the unmanned aerial vehicle 20 based on the position estimated by the position estimation module 57 is similar to the method described in the embodiment.

According to Modification Example (6), the position of the user can be estimated by using an electromagnetic wave or sound wave to move the unmanned aerial vehicle 20 toward the user, and thus it is possible to enhance the probability of the user receiving the package at the delivery destination even under an environment in which the position of the user cannot be estimated by using, for example, the photographed image.

(7) Further, for example, the user may indicate a positional relationship between the user and the unmanned aerial vehicle 20 by himself or herself. The terminal 30 in Modification Example (7) of the present invention receives a positional relationship indication operation for indicating a positional relationship between the terminal 30 and the unmanned aerial vehicle 20. The positional relationship indication operation is an operation for indicating the position of the unmanned aerial vehicle 20 as viewed from the user, and may be an operation input into the operation device 34. However, in this description, the positional relationship indication operation is to change the direction or posture of the terminal 30.

FIG. 15 is a diagram for illustrating a situation in which the user indicates the positional relationship between the user and the unmanned aerial vehicle 20. In this description, the principle of triangulation is used. For example, after the unmanned aerial vehicle 20 arrives at the delivery destination and hovers in the sky, the unmanned aerial vehicle 20 moves by a predetermined distance L in a predetermined direction. Before the movement, the unmanned aerial vehicle 20 may notify the user of the progress direction by, for example, data communication or sound. As illustrated in FIG. 15, the user stands at a position perpendicular to the progress direction of the unmanned aerial vehicle 20, and directs the terminal 30 toward the unmanned aerial vehicle 20. Then, when the unmanned aerial vehicle 20 starts movement, the user changes the direction of the terminal 30 so that the terminal 30 faces toward the position of the moving unmanned aerial vehicle 20. In this modification example, changing the direction of the terminal 30 corresponds to the positional relationship indication operation. For example, as illustrated in FIG. 15, when the unmanned aerial vehicle 20 has moved rightward as viewed from the user, the user directs the terminal 30 rightward from the front side. The terminal 30 acquires an angle θ by which the direction of the terminal 30 has changed from start to stop of movement by the unmanned aerial vehicle, by using, for example, the gyro sensor or geomagnetic sensor, and transmits the angle θ to the unmanned aerial vehicle 20.

The position estimation module 57 estimates the position of the user based on the positional relationship indication operation. For example, the position estimation module 57 estimates the position of the user based on the current position of the unmanned aerial vehicle 20 and the positional relationship indicated by the positional relationship indication operation. When the direction of the terminal 30 is used as in this modification example, the position estimation module 57 estimates the position and direction of the user as viewed from the unmanned aerial vehicle 20 based on the movement distance L and the angle θ. For example, in this description, the user has moved to a predetermined position at the time of start of movement by the unmanned aerial vehicle 20, and thus the position estimation module 57 can acquire all the angles required by triangulation as long as the angle θ is acquired. Thus, the position estimation module 57 estimates the position of the user based on the movement distance L and the angle θ. In the following, processing of movement by the unmanned aerial vehicle 20 based on the position estimated by the position estimation module 57 is similar to the method described in the embodiment.

According to Modification Example (7), the position of the user is estimated based on the positional relationship indication operation performed by the user, and thus it is possible to estimate the position of the user more accurately. As a result, the unmanned aerial vehicle 20 into which the package is loaded can be moved closer to the user, and it is possible to alleviate the labor of the user at the time of reception of the package more effectively.

A method of estimating the position of the user by using the positional relationship indication operation is not limited to the above-mentioned example. For example, the position estimation module 57 may estimate the positional relationship by using an elevation angle at a time when the terminal 30 faces the unmanned aerial vehicle 20 in the sky. Also in this case, the unmanned aerial vehicle 20 may move in a predetermined direction by a predetermined distance, and the position estimation module 57 may estimate the position of the user based on the change in elevation angle during that time. Further, the positional relationship indication operation is not limited to an operation of changing the direction of the terminal 30. For example, the positional relationship indication operation may correspond to an operation of indicating the position and direction of the unmanned aerial vehicle 20 as viewed from the user. In this case, the display 35 may display a plurality of images for the user to indicate the position of the unmanned aerial vehicle as viewed from the user, and the position estimation module 57 may estimate the position of the user based on the position indicated by an image selected by the user from among the plurality of images.

(8) Further, for example, the user may use the terminal 30 to operate the unmanned aerial vehicle 20. The terminal 30 receives a direction instruction operation for indicating a movement direction of the unmanned aerial vehicle 20. The direction instruction operation may be performed through the operation device 34 of the terminal 30, or may be performed by inclining the terminal 30. When the terminal 30 is inclined, the inclination of the terminal 30 is detected by the gyro sensor, and the direction of inclination of the terminal 30 is a direction indicated through the direction instruction operation. The direction instruction operation may be the same as operating the unmanned aerial vehicle 20 by using a remote controller.

The movement controller 58 moves the unmanned aerial vehicle 20 based on the direction instruction operation. A known method is applicable to the method of moving the unmanned aerial vehicle 20 based on the direction instruction operation. In this description, the user is not confirmed to be at the delivery destination until the checking module 56 finishes checking, and thus the movement controller 58 inhibits movement based on the direction instruction operation, and permits movement based on the direction instruction operation when the checking module 56 finishes checking. For example, until the checking module 56 finishes checking, the terminal 30 may not receive the direction instruction operation, or may receive the direction instruction operation itself but not cause the unmanned aerial vehicle 20 to move based on the direction instruction operation.

According to Modification Example (8) of the present invention, the unmanned aerial vehicle 20 moves based on the direction instruction operation given by the user, and thus the unmanned aerial vehicle 20 into which the package is loaded can be moved closer to the user, and it is possible to alleviate the labor of the user at the time of reception of the package more effectively.

(9) Further, for example, the position of the user may be estimated by short-range communication. The position estimation module 57 estimates the position of the user based on a communication state in a case where the unmanned aerial vehicle 20 and the terminal 30 are connected to each other by short-range communication. For example, the position estimation module 57 estimates the position of the user based on the distance information on a distance between the unmanned aerial vehicle 20 and the terminal 30, which is acquired by using short-range communication. The method of acquiring the distance information by using short-range communication is as described in Modification Example (3). In this case, the position estimation module 57 moves the unmanned aerial vehicle 20 in a predetermined direction, and estimates that the user is in the predetermined direction when the distance information indicates a smaller distance, or estimates that the user is in a direction opposite to the predetermined direction when the distance information indicates a larger distance. In the following, processing moving the unmanned aerial vehicle 20 based on the position estimated by the position estimation module 57 is similar to the method described in the embodiment.

According to Modification Example (9) of the present invention, the position of the user is estimated by short-range communication to move the unmanned aerial vehicle 20, and thus the unmanned aerial vehicle 20 into which the package is loaded can be moved closer to the user, and it is possible to alleviate the labor of the user at the time of reception of the package more effectively.

(10) Further, for example, the position estimation module 57 may not estimate the position of the user, and when the user is confirmed to be at the delivery destination, the unmanned aerial vehicle 20 may be moved toward the user by decreasing the height of the unmanned aerial vehicle 20.

For example, after the unmanned aerial vehicle 20 has arrived at the delivery destination, the unmanned aerial vehicle 20 waits at a height of a predetermined level or more. The method of detecting a height may be to use an altimeter, or to detect a distance to the ground by using the infrared sensor. The height may be a height specified in advance, and for example, may be a height beyond reach of a human. The unmanned aerial vehicle 20 performs hovering control at a height (e.g., 5 meters) of the predetermined level or more.

When the checking module 56 finishes checking, the movement controller 58 causes the unmanned aerial vehicle 20 to descend to a height of a predetermined level or less at the delivery destination, to thereby move the unmanned aerial vehicle 20 toward the user. The movement controller 58 may decrease the height by decreasing a parameter indicating the number of rotations of the propeller. Further, when the unmanned aerial vehicle 20 descends to a predetermined level of height, the unmanned aerial vehicle 20 may perform hovering control again. This height is a height (e.g., 1 meter) that is within reach of a human. The movement controller 58 may cause the unmanned aerial vehicle 20 to land on the ground.

According to Modification Example (10) of the present invention, when the user is confirmed to be at the delivery destination, the unmanned aerial vehicle 20 decreases its height, and thus the unmanned aerial vehicle 20 waits at a location that is beyond reach of a human until checking is finished, and can decrease its height to a height that allows passage of the package when checking is finished. Therefore, it is possible to enhance the probability of the user receiving the package.

(11) Further, for example, the camera 24A may photograph the situation in which the unmanned aerial vehicle 20 passes the package, and store the photographed situation into, for example, the server 10 as a piece of evidence of passage of the package. For example, when the unmanned aerial vehicle 20 detects passage of the package by the user, the camera 24A photographs the situation in which the user receives the package, and transmits the photographed image to the server 10. The timing of photographing by the camera 24A may be any timing of arrival of the unmanned aerial vehicle 20 at the delivery destination. After the camera 24A has arrived at the delivery destination or after the checking module 56 finishes checking, the camera 24A may continuously photograph images. In other cases, for example, the camera 24A may photograph an image after the position estimation module 57 has estimated the position of the user, or may photograph an image when the distance information acquired by the distance information acquisition module 59 indicates a value smaller than a threshold value.

The server 10 in Modification Example (11) of the present invention includes the image storage module 62. The controller 11 mainly implements the image storage module 62. The image storage module 62 stores an image, which is obtained by the camera 24A photographing the situation in which the user receives the package, into the data storage 50. The image may be stored into the delivery database or another database. The image storage module 62 receives image data on the photographed image from the unmanned aerial vehicle 20 for storage.

According to Modification Example (11), the situation in which the user receives the package is stored as an image, and thus it is possible to save a piece of evidence at the time of reception. Thus, when a third person has illegally received the package by some chance, it is possible to identify the third person who has illegally received the package, and prevent the package from being stolen.

(12) Further, for example, in the embodiment and Modification Examples (1) to (11), the description has been given taking the case of the user receiving the package from the unmanned aerial vehicle 20 as an example. However, the logistics system 1 is also applicable to a scene in which the user leaves the package to the unmanned aerial vehicle 20. That is, the processing of the present invention is also applicable to a case in which the unmanned aerial vehicle 20 visits the user for collection of the package. In this case, the phrase "delivery destination" in the above description can be replaced with a phrase "collection destination", and the phrase "receive package" can be replaced with a phrase "leave package".

For example, when the processing in this embodiment is executed in a scene in which the user leaves the package, the user has a right to leave the package, and is, for example, a requester of delivery or his or her representative. Further, the location information is information on a collection destination of the package. The collection destination is a location at which the user leaves the package. The unmanned aerial vehicle 20 moves to the collection destination based on the location information, and checks whether or not the user is at the collection destination similarly to the method described in the embodiment. The server 10 may transmit an authentication image to the user based on the requester information. The user displays the authentication image on the terminal 30 at the collection destination, and directs the authentication image toward the unmanned aerial vehicle 20. After that, similarly to the embodiment, when the unmanned aerial vehicle 20 confirms the user at the collection destination, the unmanned aerial vehicle 20 approaches the user to collect the package. When the unmanned aerial vehicle 20 detects that the package has been collected, the unmanned aerial vehicle 20 accommodating the package returns to the departure point. The collected package may be delivered by a staff member of the carrier, or may be delivered by the unmanned aerial vehicle 20 similarly to the methods described in the embodiment and Modification Examples (1) to (11).

Further, also when the unmanned aerial vehicle 20 collects the package, the unmanned aerial vehicle 20 may confirm that the user is at the collection destination similarly to the methods described in Modification Examples (1) to (5), and estimate the position of the user as in the embodiment and Modification Examples (6), (7), and (9). Further, also when the unmanned aerial vehicle 20 collects the package, the user may maneuver the unmanned aerial vehicle 20 at the collection destination as in Modification Example (8), or the unmanned aerial vehicle 20 may decrease the height at the collection destination to approach the user as in Modification Example (10). Further, also when the unmanned aerial vehicle 20 collects the package, the camera 24A may photograph the situation of leaving the package as in Modification Example (11).

(13) Further, for example, any two or more of Modification Examples (1) to (12) may be combined with each other.

Further, for example, in the description of the embodiment, the server 10 transmits an authentication image to the terminal 30, but when the unmanned aerial vehicle 20 and the terminal 30 are connected to each other by short-range communication, the unmanned aerial vehicle 20 may transmit the authentication image to the terminal 30. In this case, the terminal 30 receives and displays the authentication image after the user has arrived at the collection destination or the delivery destination. Processing to be executed after the terminal 30 displays the authentication image is similar to the method described in the embodiment.

Further, for example, sound may be used to check whether or not the user is at the collection destination or delivery destination. In this case, the sensor group 24 includes a microphone. The server 10 transmits a password for authenticating the user to the unmanned aerial vehicle 20 and the terminal 30. The password may be formed of words defined in advance. After the user confirms that the unmanned aerial vehicle 20 has arrived at the collection destination or the delivery destination, the user utters the password loud enough to be detected by the microphone. The checking module 56 executes known sound analysis for comparison with the password received from the server 10, and when there is a match, the checking module 56 determines that the user is at the collection destination or the delivery destination. This match is also not required to be an exact match, and may allow a certain degree of deviation. Further, also in this case, after the unmanned aerial vehicle 20 arrives at the collection destination or the delivery destination, the abovementioned password may be output by a sound or image. Further, for example, the user may input a sound into the terminal 30. Further, the password may be input not by a sound but by a text.

Further, for example, the position estimation module 57 may estimate the position of the user by using a sound. In this case, the sensor group 24 includes a directional microphone. The position estimation module 57 identifies a direction in which the password uttered by the user is detected from the directional microphone, and estimates that the user is in that direction.

Further, for example, each function described above may be implemented by any one of computers in the logistics system 1, and functions that are described as being implemented by the server 10 may be implemented by the unmanned aerial vehicle 20 or the terminal 30. Similarly, functions that are described as being implemented by the unmanned aerial vehicle 20 may be implemented by the server 10 or the terminal 30. Functions that are described as being implemented by the terminal 30 may be implemented by the server 10 or the unmanned aerial vehicle 20. Further, functions other than those of the association module 51, the instruction module 54, the arrival determination module 55, the checking module 56, and the movement controller 58 may be omitted among the functions described above. Further, although a description has been given of a case in which the unmanned aerial vehicle 20 is managed by the carrier, the logistics system 1 is only required to be used in a scene in which the package is collected or delivered. For example, the unmanned aerial vehicle 20 may be managed by a business operator of an online shopping mall.

The invention claimed is:

1. A logistics system, comprising at least one processor configured to:
  associate authentication information on a user who is to leave or receive a package with the package and record the associated authentication information into a storage;
  instruct an unmanned aerial vehicle into which the package is to be loaded to move to a first location, based on location information on a location of a collection destination of the package or a location of a delivery destination of the package;
  determine whether the unmanned aerial vehicle has arrived at the first location based on position information on a position of the unmanned aerial vehicle and the location information;
  check whether the user is at the first location, when it is determined that the unmanned aerial vehicle has arrived at the first location, based on the authentication information associated with the package and on a situation of the first location detected by the unmanned aerial vehicle;
  move the unmanned aerial vehicle toward the user at the first location after it is confirmed that the user is at the first location;
  wherein the unmanned aerial vehicle includes a camera,
  wherein the at least one processor is configured to perform checking by determining whether photographed images, which are obtained by photographing the situation of the first location continuously or repeatedly by the camera, exhibit a predetermined pattern of changes;
  wherein the predetermined pattern is a change in a shape of one or more objects;
  wherein the one or more objects are an authentication image displayed on a terminal of the user;
  wherein the at least one processor is configured to:
    acquire distance information on a distance between the unmanned aerial vehicle and the user, and
    check whether the photographed image contains the authentication image in a second display mode different from the first display mode, to thereby perform checking in a stepwise manner depending on the distance information, when the distance information indicates a distance smaller than a predetermined distance,
  wherein the terminal of the user changes the authentication image from the first display mode to the second display mode when the distance information indicates the distance smaller than the predetermined distance.

2. The logistics system according to claim 1, wherein the at least one processor is configured to:
  notify the user of the authentication information associated with the package, and
  perform checking based on the authentication information.

3. The logistics system according to claim 2,
  wherein the authentication information includes authentication image data on an authentication image,
  wherein the at least one processor is configured to transmit the authentication image data to a terminal of the user, and
  perform checking by determining whether a photographed image contains the authentication image displayed on the terminal, wherein, the photographed image is obtained by using the camera to photograph the situation of the first location.

4. The logistics system according to claim 1,
wherein the authentication information includes appearance information on an appearance of the user, and
wherein the at least one processor is configured to perform checking by determining whether a photographed image, which is obtained by photographing the situation of the first location by the camera, contains the user.

5. A logistics system, comprising at least one processor configured to:
associate authentication information on a user who is to leave or receive a package with the package and record the associated authentication information into a storage;
instruct an unmanned aerial vehicle into which the package is to be loaded to move to a first location, based on location information on a location of a collection destination of the package or a location of a delivery destination of the package;
determine whether the unmanned aerial vehicle has arrived at the first location based on position information on a position of the unmanned aerial vehicle and the location information;
check whether the user is at the first location, when it is determined that the unmanned aerial vehicle has arrived at the first location, based on the authentication information associated with the package and on a situation of the first location detected by the unmanned aerial vehicle;
move the unmanned aerial vehicle toward the user at the first location after it is confirmed that the user is at the first location;
wherein the unmanned aerial vehicle includes a camera,
wherein the at least one processor is configured to perform checking by determining whether photographed images, which are obtained by photographing the situation of the first location continuously or repeatedly by the camera, exhibit a predetermined pattern of changes;
wherein the predetermined pattern is a change in a shape of one or more objects;
wherein the one or more objects are an authentication image displayed on a terminal of the user;
wherein the at least one processor is configured to:
perform checking by determining whether a degree of similarity between a situation of the first location and a predetermined situation is equal to or larger than a threshold value, wherein the situation is contained in the photographed image obtained by photographing the situation of the first location by the camera,
acquire distance information on a distance between the unmanned aerial vehicle and the user, and
cause the unmanned aerial vehicle to move to the user when the distance information indicates a distance larger than a predetermined distance and change the threshold value and perform determination based on the changed threshold value, to thereby perform checking in a stepwise manner depending on the distance information, when the distance information indicates a distance smaller than the predetermined distance.

6. The logistics system according to claim 1,
wherein the unmanned aerial vehicle and a terminal are each capable of performing short-range communication,
wherein the at least one processor is configured to acquire the authentication information from the terminal when the unmanned aerial vehicle and the terminal are connected to each other by the short-range communication, and
perform checking based on the authentication information.

7. The logistics system according to claim 1,
wherein the at least one processor is configured to estimate a position of the user based on a photographed image, which is obtained by photographing the situation of the first location by the camera, and
move the unmanned aerial vehicle based on the position.

8. The logistics system according to claim 1,
wherein the unmanned aerial vehicle is configured to generate an electromagnetic wave or sound wave having directivity in a plurality of directions, when it is determined that the unmanned aerial vehicle has arrived at the first location,
wherein the at least one processor is configured to:
acquire timing information on a timing at which a terminal has detected the electromagnetic wave or the sound wave;
estimate a position of the user based on the timing information, and
move the unmanned aerial vehicle based on the position.

9. The logistics system according to claim 1,
wherein a terminal is configured to receive a positional relationship indication operation for indicating a positional relationship between the terminal and the unmanned aerial vehicle,
wherein the at least one processor is configured to estimate a position of the user based on the positional relationship indication operation, and
move the unmanned aerial vehicle based on the position.

10. The logistics system according to claim 1,
wherein a terminal is configured to receive a direction instruction operation for indicating a movement direction of the unmanned aerial vehicle, and
wherein the at least one processor is configured to move the unmanned aerial vehicle based on the direction instruction operation.

11. The logistics system according to claim 1,
wherein the unmanned aerial vehicle and a terminal are each capable of performing short-range communication,
wherein the at least one processor is configured to:
estimate a position of the user based on a communication state in a case where the unmanned aerial vehicle and the terminal are connected to each other by the short-range communication, and
move the unmanned aerial vehicle based on the position.

12. The logistics system according to claim 1,
wherein the unmanned aerial vehicle is configured to wait at a height of a predetermined level or more after the unmanned aerial vehicle has arrived at the first location, and
wherein the at least one processor is configured to cause, when it is confirmed that the user is at the first location, the unmanned aerial vehicle to descend to a height less than the predetermined level at the first location, to thereby move the unmanned aerial vehicle toward the user.

13. The logistics system according to claim 1, wherein the at least one processor is configured to acquire terminal position information on a position of a terminal of the user as the location information.

14. The logistics system according to claim 1,
wherein the at least one processor is configured to store an image, which is obtained by photographing the user leaving or receiving the package by the camera, into the storage.

15. A non-transitory computer-readable information storage medium having stored thereon a program for causing a computer to:
associate authentication information on a user who is to leave or receive a package with the package and record the associated authentication information into a storage;
instruct an unmanned aerial vehicle into which the package is to be loaded to move to a first location, based on location information on a location of a collection destination of the package or a location of a delivery destination of the package;
determine whether the unmanned aerial vehicle has arrived at the first location based on position information on a position of the unmanned aerial vehicle and the location information;
check whether the user is at the first location, when it is determined that the unmanned aerial vehicle has arrived at the first location, based on the authentication information associated with the package and on a situation of the first location detected by the unmanned aerial vehicle; and
move the unmanned aerial vehicle toward the user at the first location after it is confirmed that the user is at the first location;
wherein the unmanned aerial vehicle includes a camera,
check by determining whether photographed images, which are obtained by photographing the situation of the first location continuously or repeatedly by the camera, exhibit a predetermined pattern of changes;
wherein the predetermined pattern is a change in a shape of one or more objects;
wherein the one or more objects are an authentication image displayed on a terminal of the user;
wherein the program causes the computer to:
acquire distance information on a distance between the unmanned aerial vehicle and the user, and
check whether the photographed image contains the authentication image in a second display mode different from the first display mode, to thereby perform checking in a stepwise manner depending on the distance information, when the distance information indicates a distance smaller than a predetermined distance,
wherein the terminal of the user changes the authentication image from the first display mode to the second display mode when the distance information indicates the distance smaller than the predetermined distance.

16. The logistics system according to claim 1,
wherein the predetermined pattern is switching between authentication images in a predetermined display order and/or at a predetermined timing.

17. The logistics system according to claim 1, wherein the shapes of the one or more objects are regular polygons.

18. A non-transitory computer-readable information storage medium having stored thereon a program for causing a computer to:
associate authentication information on a user who is to leave or receive a package with the package and record the associated authentication information into a storage;
instruct an unmanned aerial vehicle into which the package is to be loaded to move to a first location, based on location information on a location of a collection destination of the package or a location of a delivery destination of the package;
determine whether the unmanned aerial vehicle has arrived at the first location based on position information on a position of the unmanned aerial vehicle and the location information;
check whether the user is at the first location, when it is determined that the unmanned aerial vehicle has arrived at the first location, based on the authentication information associated with the package and on a situation of the first location detected by the unmanned aerial vehicle; and
move the unmanned aerial vehicle toward the user at the first location after it is confirmed that the user is at the first location;
wherein the unmanned aerial vehicle includes a camera,
check by determining whether photographed images, which are obtained by photographing the situation of the first location continuously or repeatedly by the camera, exhibit a predetermined pattern of changes;
wherein the predetermined pattern is a change in a shape of one or more objects;
wherein the one or more objects are an authentication image displayed on a terminal of the user;
wherein the program causes the computer to:
perform checking by determining whether a degree of similarity between a situation of the first location and a predetermined situation is equal to or larger than a threshold value, wherein the situation is contained in the photographed image obtained by photographing the situation of the first location by the camera,
acquire distance information on a distance between the unmanned aerial vehicle and the user, and
cause the unmanned aerial vehicle to move to the user when the distance information indicates a distance larger than a predetermined distance and change the threshold value and perform determination based on the changed threshold value, to thereby perform checking in a stepwise manner depending on the distance information, when the distance information indicates a distance smaller than the predetermined distance.

* * * * *